US011360370B2

(12) United States Patent
Sato

(10) Patent No.: US 11,360,370 B2
(45) Date of Patent: Jun. 14, 2022

(54) LIGHT SOURCE DEVICE AND PROJECTION-TYPE DISPLAY

(71) Applicant: SONY CORPORATION, Tokyo (JP)

(72) Inventor: Yuji Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/651,076

(22) PCT Filed: Aug. 16, 2018

(86) PCT No.: PCT/JP2018/030394
§ 371 (c)(1),
(2) Date: Mar. 26, 2020

(87) PCT Pub. No.: WO2019/069563
PCT Pub. Date: Apr. 11, 2019

(65) Prior Publication Data
US 2020/0225564 A1 Jul. 16, 2020

(30) Foreign Application Priority Data

Oct. 5, 2017 (JP) .............................. JP2017-194978

(51) Int. Cl.
*G03B 21/14* (2006.01)
*G02B 26/00* (2006.01)
*G03B 21/20* (2006.01)

(52) U.S. Cl.
CPC ......... *G03B 21/142* (2013.01); *G02B 26/008* (2013.01); *G03B 21/204* (2013.01)

(58) Field of Classification Search
CPC ............ G03B 21/00–64; G02B 26/008; G02B 26/00–129; H04N 9/31–3197
See application file for complete search history.

(56) References Cited

U.S. PATENT DOCUMENTS 5,818,639 A 10/1998 Furuya
2004/0021959 A1* 2/2004 Jang ...................... G02B 13/16
359/811

(Continued)

FOREIGN PATENT DOCUMENTS

CN 205374965 U 7/2016
CN 107179649 A 9/2017

(Continued)

OTHER PUBLICATIONS

International Search Report dated Oct. 23, 2018 in PCT/JP2018/030394 filed Aug. 16, 2018, 2 pages.

*Primary Examiner* — Michelle M Iacoletti
*Assistant Examiner* — Christopher A Lamb, II
(74) *Attorney, Agent, or Firm* — Oblon, McClelland, Maier & Neustadt, L.L.P.

(57) ABSTRACT

A light source device according to an embodiment of the present disclosure includes: a light source section; a rotating body; a motor; a housing; one or more lens groups; a lens holding section; and an adjusting mechanism. The rotating body includes a fluorescent light body. The fluorescent light body is excited by excitation light from the light source section to output fluorescent light. The motor drives the rotating body. The housing accommodates the rotating body. The one or more lens groups gather the excitation light from the light source section and direct the excitation light toward the rotating body. The lens holding section holds the one or more lens groups. The adjusting mechanism adjusts a distance between the rotating body and the one or more lens groups.

13 Claims, 17 Drawing Sheets

(56) References Cited

U.S. PATENT DOCUMENTS

| | | | |
|---|---|---|---|
| 2008/0036896 A1* | 2/2008 | Chung | G03B 21/00 |
| | | | 348/333.01 |
| 2012/0106126 A1 | 5/2012 | Nojima et al. | |
| 2012/0162993 A1* | 6/2012 | Cheng | F21V 17/02 |
| | | | 362/284 |
| 2014/0168614 A1* | 6/2014 | Matsubara | G02B 27/141 |
| | | | 353/31 |
| 2014/0362350 A1 | 12/2014 | Takamatsu | |
| 2016/0077326 A1 | 3/2016 | Yamagishi et al. | |
| 2017/0205694 A1* | 7/2017 | Zakoji | G03B 21/204 |
| 2018/0088317 A1 | 3/2018 | Yoshikawa | |
| 2018/0149317 A1 | 5/2018 | Zhu | |

FOREIGN PATENT DOCUMENTS

| | | |
|---|---|---|
| JP | 9-90512 A | 4/1997 |
| JP | 2006-93089 A | 4/2006 |
| JP | 2009-277552 A | 11/2009 |
| JP | 2012-221820 A | 11/2012 |
| JP | 2013-25215 A | 2/2013 |
| JP | 2014-238485 A | 12/2014 |
| JP | 2017-9684 A | 1/2017 |
| JP | 2017-130344 A | 7/2017 |
| JP | 2017-161654 A | 9/2017 |
| JP | 2018-120174 A | 8/2018 |
| WO | WO 2017/098706 A1 | 6/2017 |
| WO | WO 2017/152885 A1 | 9/2017 |

* cited by examiner

LIGHT SOURCE DEVICE AND PROJECTION-TYPE DISPLAY

TECHNICAL FIELD

The present disclosure relates to a light source device that is able to adjust a distance between a fluorescent light body and a condensing lens group, and a projection-type display that includes the light source device.

BACKGROUND ART

In recent years, a light-emitting device (light source device) using, for example, a semiconductor laser (laser diode; LD) and a fluorescent light body has been developed as a light-source optical system for a projection-type display (projector). The projection-type display (projector) projects a display screen of a personal computer, a video image, or the like onto a screen. Such a projector includes various lenses disposed on the optical path of light emitted from the light source (LD). Of these, the relative positions of the fluorescent light body and a condensing lens group that gathers light emitted from the light source onto the fluorescent light body considerably influence luminance of a projector.

Meanwhile, for example, PTL 1 discloses a light source device that includes a wheel section, a lens section, and a holder. The wheel section includes a wheel including a fluorescent light body, and a motor that drives the wheel. The lens section includes a lens that gathers combined light emitted from the wheel section. The holder supports the wheel section and the lens section as one unit. In addition, for example, PTL 2 discloses a method of adjusting a light source device for accurately and rapidly adjusting a position where a fluorescent light body is disposed.

CITATION LIST

Patent Literature

PTL 1: Japanese Unexamined Patent Application Publication No. 2014-238485
PTL 2: Japanese Unexamined Patent Application Publication No. 2012-221820

SUMMARY OF THE INVENTION

As described above, a light source device having high luminance is demanded.

It is desirable to provide a light source device having high luminance, and a projection-type display.

A light source device according to an embodiment of the present disclosure includes: a light source section; a rotating body; a motor; a housing; one or more lens groups; a lens holding section; and an adjusting mechanism. The rotating body includes a fluorescent light body. The fluorescent light body is excited by excitation light from the light source section to output fluorescent light. The motor drives the rotating body. The housing accommodates the rotating body. The one or more lens groups gather the excitation light from the light source section and direct the excitation light toward the rotating body. The lens holding section holds the one or more lens groups. The adjusting mechanism adjusts a distance between the rotating body and the one or more lens groups.

A projection-type display according to an embodiment of the present disclosure includes: a light source device; an optical modulation element that modulates light emitted from the light source device; and a projection optical system that projects the light from the optical modulation element. The light source device included in this projection-type display includes the same components as those of the light source device according to the embodiment of the present disclosure described above.

The light source device according to the embodiment and the projection-type display according to the embodiment of the present disclosure each include an adjusting mechanism. The adjusting mechanism adjusts a distance between a rotating body and a lens holding section. The rotating body includes a fluorescent light body. The fluorescent light body is excited by excitation light from a light source section to output fluorescent light. The lens holding section holds one or more lens groups. The one or more lens groups gather the excitation light from the light source section and direct the excitation light toward the rotating body. This makes it possible to optimize a distance between the fluorescent light body and the one or more lens groups.

The light source device according to the embodiment and the projection-type display according to the embodiment of the present disclosure each include the adjusting mechanism. The adjusting mechanism adjusts the distance between the rotating body and the lens holding section. The rotating body includes the fluorescent light body. The lens holding section holds the one or more lens groups. The one or more lens groups gather the excitation light from the light source section and direct the excitation light toward the rotating body. This optimizes the distance between the fluorescent light body and the one or more lens groups. It is thus possible to provide the light source device having high luminance, and the projection-type display including the light source device.

It should be noted that the effects described here are not necessarily limited, but any of effects described in the present disclosure may be included.

BRIEF DESCRIPTION OF DRAWING

FIG. 15 is a schematic cross-sectional view of a configuration of a fluorescent light body wheel and surrounding member thereof included in a light source device according to a modification example 5 of the present disclosure.

MODES FOR CARRYING OUT THE INVENTION

Figure 1:
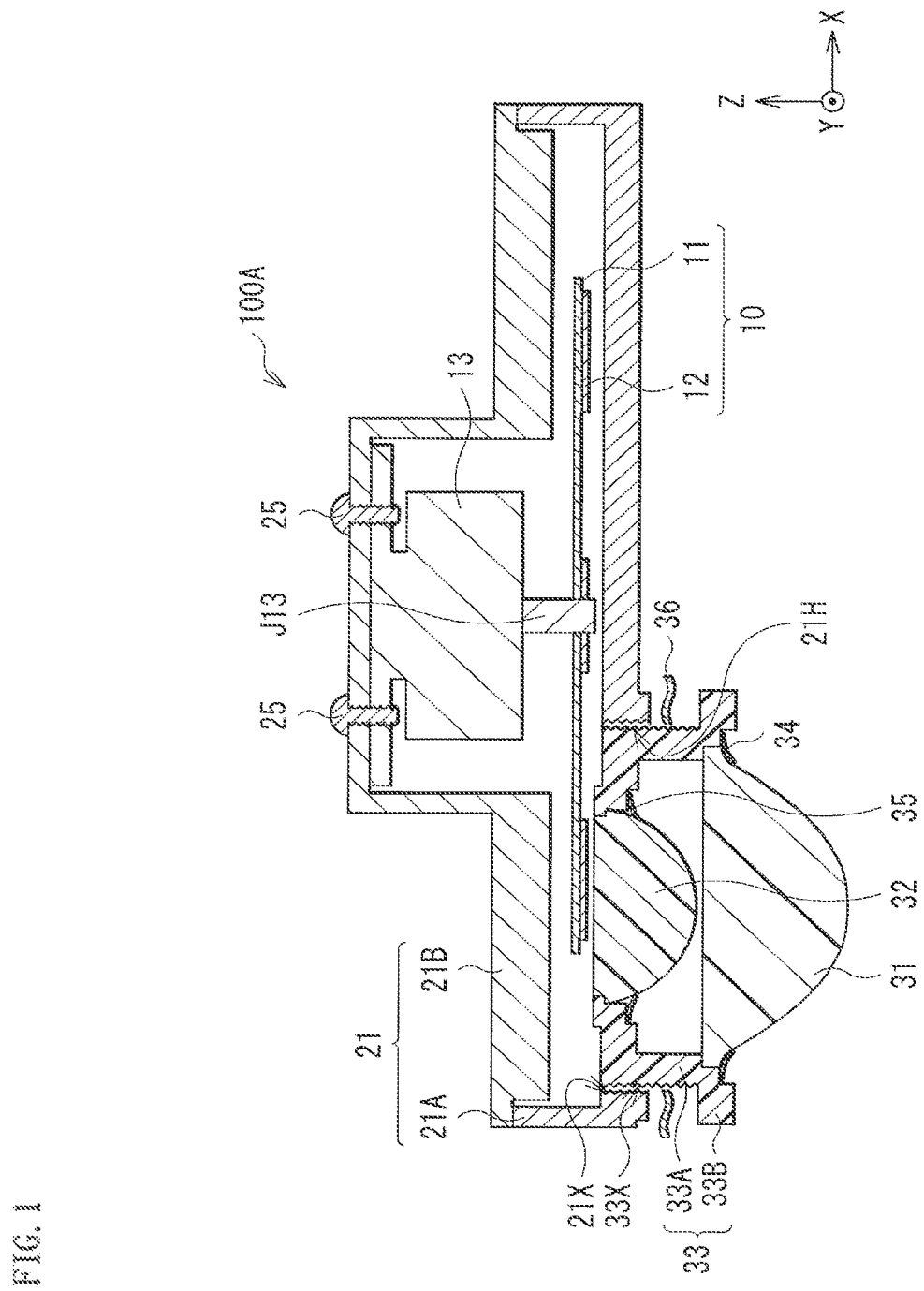
FIG. 1 is a schematic cross-sectional view of one example of a configuration of a fluorescent light body wheel and surrounding member thereof included in a light source device according to a first embodiment of the present disclosure.

The following describes embodiments of the present disclosure in detail with reference to the drawings. The following description is a specific example of the present disclosure, but the present disclosure is not limited to the following embodiment. Moreover, the present disclosure does not limit the disposition, dimensions, dimension ratios, and the like of respective components illustrated in the drawings thereto. It should be noted that description is given in the following order.
1. First Embodiment (Light source device including a lens-position adjusting mechanism including a thread provided on a lens holding section and a housing, and a wave washer)
1-1. Configuration of Lens-Position Adjusting Mechanism
1-2. Configuration of Light Source Device
1-3. Configuration of Projector
1-4. Workings and Effects
2. Modification Examples
2-1. Modification Example 1 (Example of a lens-position adjusting mechanism including a thread and a lock nut)
2-2. Modification Example 2 (Example of a lens-position adjusting mechanism including a thread and a setscrew)
2-3. Modification Example 3 (Example of a lens-position adjusting mechanism including a thread and an adhesive)
2-4. Modification Example 4 (Example of a lens-position adjusting mechanism including a thread provided on a motor holding section and a housing, and a wave washer)
3. Second Embodiment (Example of a lens-position adjusting mechanism including a thread and a feed screw provided on a motor holding section, and a wave washer)
3-1. Configuration of Lens-Position Adjusting Mechanism
3-2. Workings and Effects
4. Modification Examples
4-1. Modification Example 5 (Example of a lens-position adjusting mechanism including a thread and a feed screw, and a lock nut)
4-2. Modification Example 6 (Example of a lens-position adjusting mechanism including a thread and a feed screw, and a setscrew)
4-3. Modification Example 7 (Example of a lens-position adjusting mechanism including a thread and a feed screw, and an adhesive)

1. First Embodiment

Figure 2:
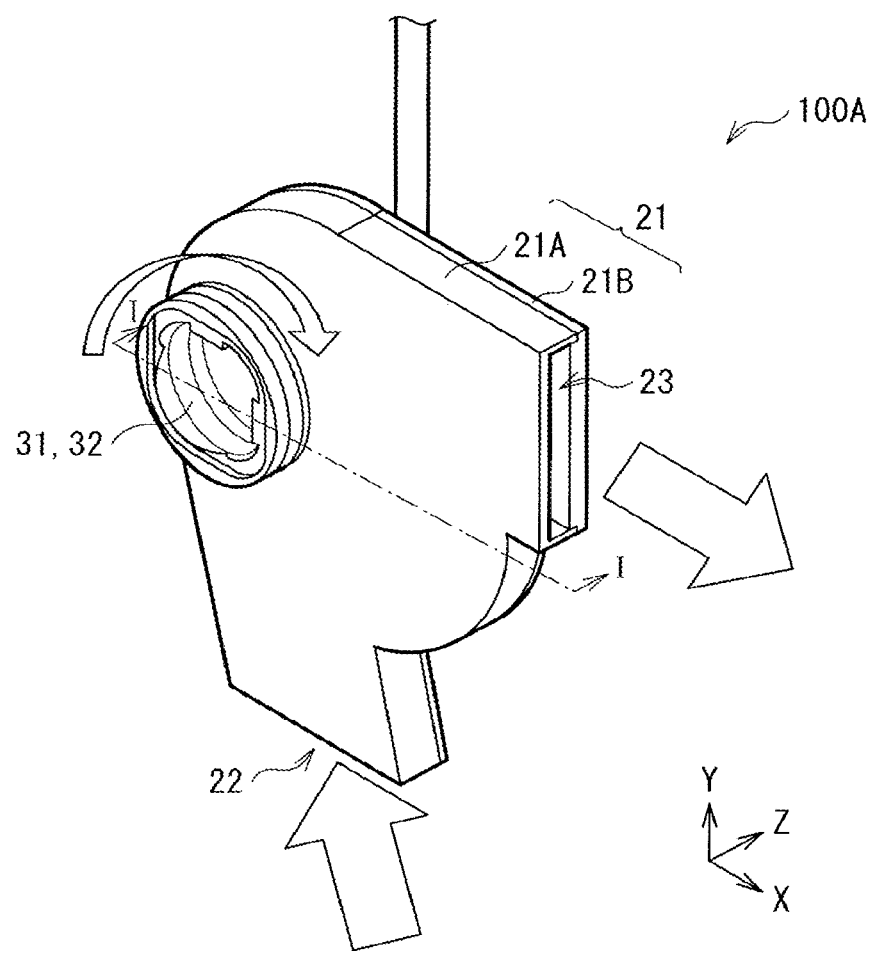
FIG. 2 is a perspective view of the fluorescent light body wheel and surrounding member thereof illustrated in FIG. 1.
Figure 3:
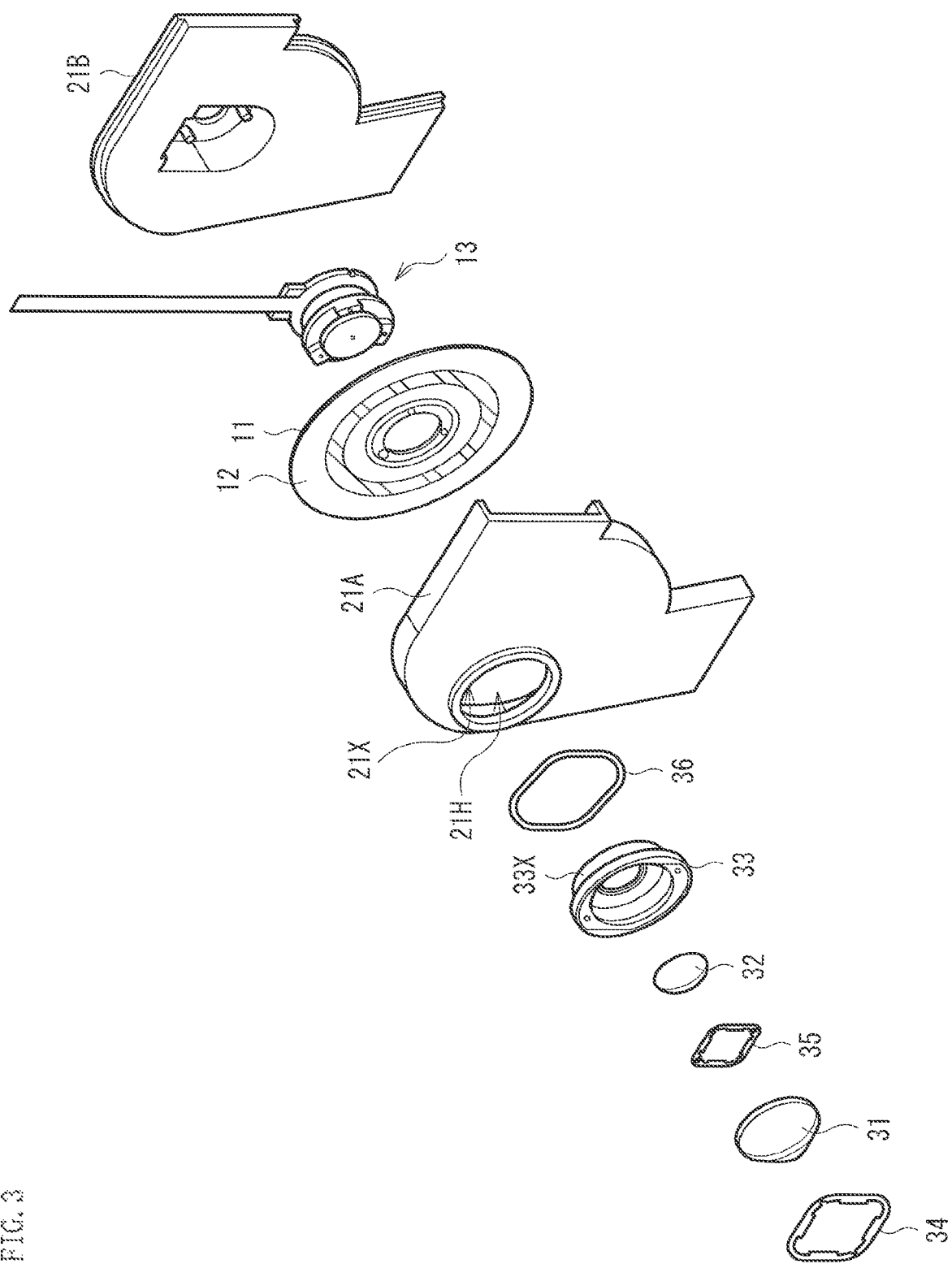
FIG. 3 is an exploded perspective view of the fluorescent light body wheel and surrounding member thereof illustrated in FIG. 1.

FIG. 1 is a diagram schematically illustrating one example of a cross-sectional configuration of a rotating body (fluorescent light body wheel 10) and surrounding members thereof included in a light source device (light source device 100A) according to a first embodiment of the present disclosure. FIG. 2 is a perspective view of the configuration of the fluorescent light body wheel 10 and surrounding members thereof illustrated in FIG. 1. FIG. 1 is a diagram illustrating a cross section taken along the line I-I in FIG. 2. FIG. 3 is an exploded perspective view of the fluorescent light body wheel 10 and surrounding members thereof illustrated in FIGS. 1 and 2. This light source device 100A is included, for example, in a projection-type display (projector) described later (see FIGS. 5 and 6). The light source device 100A according to the present embodiment includes an adjusting mechanism (lens-position adjusting mechanism) that adjusts a distance between the fluorescent light body wheel 10 and a condensing lens group (for example, condensing lenses 31 and 32).

1-1. Configuration of Lens-Position Adjusting Mechanism

The fluorescent light body wheel 10 included in the light source device 100A is accommodated, for example, in a housing (housing 21). A lens holding section (lens holder 33) is fastened to the housing 21. The lens holding section (lens holder 33) holds the condensing lenses 31 and 32 that gather excitation light EL emitted from a light source section 110 (see, for example, FIG. 5) described later, and direct the excitation light EL toward the fluorescent light body wheel 10. The lens-position adjusting mechanism according to the present embodiment includes the housing 21 and the lens holder 33. More specifically, the lens-position adjusting mechanism includes a thread 33X provided on a fitting portion 33A of the lens holder 33, and a thread 21X provided on a side surface of an opening 21H for fitting that corresponds to the fitting portion 33A of the lens holder 33. The thread 33X and the thread 21X are fitted to each other. The housing 21 and the lens holder 33 are fixed to each other, for example, using a wave washer 36 disposed between a front portion of the housing 21 and a press portion 33B of the lens holder 33.

The fluorescent light body wheel 10 includes, for example, a reflective wavelength conversion element. The fluorescent light body wheel 10 includes a fluorescent-light body layer 12 provided on a wheel base plate 11 that is able to rotate around a rotating shaft (for example, a shaft 13J).

The wheel base plate 11 supports the fluorescent-light body layer 12. The wheel base plate 11 has, for example, a disk shape. In addition, the wheel base plate 11 preferably has a function of a heat dissipater. The wheel base plate 11 includes an inorganic material such as a metallic material or a ceramic material, which has high thermal conductivity and to which mirror-finish processing is applicable. The material included in the wheel base plate 11 includes, for example, a single-type metal such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), or palladium (Pd), or an alloy containing one or more types of these materials. Alternatively, it is also possible to use an alloy of CuW in which the percentage of W contained is 80 atomic % or higher, CuMo in which the percentage of Mo contained is 40 atomic % or higher, or the like as the metallic material included in the wheel base plate 11. The ceramic material includes, for example, a material containing silicon carbide (SiC), aluminum nitride (AlN), beryllium oxide (BeO), a composite material of Si and SiC, or a composite material of SiC and Al (where the percentage of SiC contained is 50% or higher).

It is preferable to form a reflective film on a surface of the wheel base plate 11 where the fluorescent-light body layer 12 is formed. For example, in addition to a dielectric multilayer, the reflective film is formed using, for example, a metal film or the like containing a metallic element such as aluminum (Al), silver (Ag), or titanium (Ti). The reflective film reflects the excitation light EL radiated from the outside or fluorescent light FL that originates from the fluorescent-light body layer 12, and functions to enhance light-emitting efficiency of the fluorescent light body wheel 10.

It should be noted that, in a case where the reflective film is formed, the wheel base plate 11 may not have a light reflecting property. In this case, it is possible to use quartz or glass for the wheel base plate 11 in addition to a crystalline material such as single Si, SiC, diamond, or sapphire. Furthermore, it is preferable to provide an anti-reflecting film on a surface of the wheel base plate 11 opposite to the surface where the fluorescent-light body layer 12 is formed.

The fluorescent-light body layer 12 includes a plurality of fluorescent light body particles. It is preferable that the fluorescent-light body layer 12 be formed, for example, in a plate shape. For example, the fluorescent-light body layer 12 includes a so-called ceramic fluorescent light body. The fluorescent-light body layer 12 is formed, for example, in a ring shape on the wheel base plate 11. The fluorescent light body particles are fluorescent light bodies in a form of particle, and absorb the excitation light EL radiated from the light source section 110 to output the fluorescent light FL. For example, as the fluorescent light body particles, a fluorescent material is used that is excited by blue laser light having a wavelength in a blue wavelength range (for example, from 400 nm to 470 nm) to output yellow fluorescent light (light in a wavelength range between a red wavelength range and a green wavelength range). Examples of such a fluorescent material include a YAG (yttrium-aluminum-garnet)-based material. The average particle size of the fluorescent light body particles is, for example, 5 μm or more and 40 μm or less. It is preferable that the fluorescent-light body layer 12 be formed to have a thickness of, for example, 40 μm or more and 200 μm or less.

The motor 13 drives the fluorescent light body wheel 10 to rotate at a predetermined rotational speed. The motor 13 drives the fluorescent light body wheel 10 to rotate the fluorescent-light body layer 12 in a plane perpendicular to a radiation direction of the excitation light EL emitted from the light source section 110 described later. Thus, an irradiated position of the fluorescent light body wheel 10 with the excitation light EL temporally changes (moves) in a plane perpendicular to the radiation direction of the excitation light at speed corresponding to the rotational speed. The motor 13 is fixed, for example, using a bolt 25 to a back surface of the housing 21 or a rear cover 21B.

The housing 21 accommodates the fluorescent light body wheel 10. The housing 21 includes, for example, a front cover 21A that covers a front surface of the fluorescent light body wheel 10, and the rear cover 21B that covers a back surface of the fluorescent light body wheel 10 and also supports the motor 13 which drives the fluorescent light body wheel 10. The front cover 21A has the opening 21H for fitting. The lens holder 33 that holds the condensing lenses 31 and 32 as described above is fitted into the opening 21H. The opening 21H has the thread 21X formed on a side surface thereof. In addition, the housing 21 has an inflow port 22 and a discharging port 23 for cooling blow fed from a cooling fan (not illustrated) that is separately provided. The cooling blow cools the fluorescent light body wheel 10. It is preferable that the housing 21 include, for example, a material having a low coefficient of thermal expansion.

The condensing lenses 31 and 32 (illustrated as a condensing optical system 113 in FIG. 5) are disposed at positions on the optical path of excitation light EL1 emitted from the light source section 110, for example, in an order of the condensing lens 31 and the condensing lens 32 from the light source section 110 side. At the positions, the condensing lenses 31 and 32 are, for example, directly opposed to the fluorescent-light body layer 12 of the fluorescent light body wheel 10. The condensing lens 31 gathers the excitation light EL from the light source section 110 and directs the excitation light EL toward the condensing lens 32. The condensing lens 32 gathers the excitation light EL1 inputted through the condensing lens 31 on the fluorescent-light body layer 12. In addition, the condensing lens 32 emits the fluorescent light FL toward the condensing lens 31. The fluorescent light FL is emitted from the fluorescent-light body layer 12. The condensing lens 31 is larger in outer diameter, for example, than the condensing lens 32. The condensing lenses 31 and 32 are respectively held at outer periphery portions thereof with the lens holder 33 using lens press portions 34 and 35.

The lens holder 33 holds the condensing lenses 31 and 32 as described above. The lens holder 33 includes the fitting portion 33A that is fitted into the opening 21H of the housing 21. The fitting portion 33A has the thread 33X formed, for example, on the entire side surface thereof. The thread 33X corresponds to the thread 21X provided on the side surface of the opening 21H of the housing 21. It is preferable that the lens holder 33 include, for example, a material having a low coefficient of thermal expansion, as with the housing 21.

In the present embodiment, it is possible to adjust a distance between the fluorescent-light body layer 12 provided on the fluorescent light body wheel 10 and the condensing lenses 31 and 32 using the thread 21X provided on the side surface of the opening 21H of the housing 21 described above and the thread 33X provided on the side surface of the fitting portion 33A of the lens holder 33. Specifically, the fitting portion 33A having the thread 33X on the side surface thereof is fitted into the opening 21H having the thread 21X on the side surface thereof to rotate the lens holder 33, thereby making it possible to adjust the distance in a Z-axis direction (for example, by about 10 μm). The thread 33X corresponds to the thread 21X. This enables the distance between the fluorescent-light body layer 12 and the condensing lenses 31 and 32 to be more finely and accurately adjusted. In addition, the wave washer 36 is disposed between the front portion of the housing 21 and the press portion 33B of the lens holder 33. This constantly applies pressure in a certain direction between the front portion of the housing 21 and the press portion 33B of the lens holder 33, fixing the position of the fitting portion 33A and also fixing the distance between the fluorescent-light body layer 12 and the condensing lenses 31 and 32 after the adjustment of lens positions. Thus, a positional displacement is suppressed that is caused, for example, because the lens holder 33 is loose. Vibration or the like of rotation of the fluorescent light body wheel 10 may cause the lens holder 33 to be loose.

Figure 4:
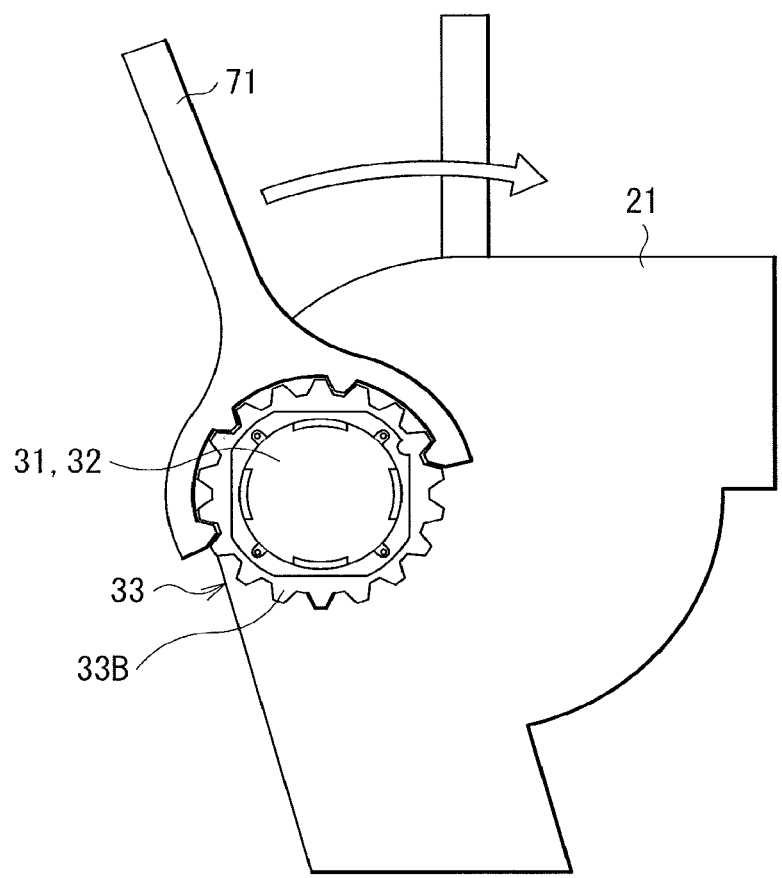
FIG. 4 is a schematic diagram illustrating another example of a configuration of a lens holding section illustrated in FIG. 1.

Furthermore, the press portion 33B of the lens holder 33 may have an uneven structure formed on an outer periphery portion as illustrated in FIG. 4. Providing the uneven structure makes the point of application far apart, for example, at the time of adjusting the distance between the fluorescent-light body layer 12 and the condensing lenses 31 and 32 using a jig 71, making it possible to increase the distance of the point of application with respect to the amount of feed. Thus, it is possible to easily feed the lens holder 33 by a small amount. This makes it possible to finely adjust the distance between the fluorescent-light body layer 12 and the condensing lenses 31 and 32, for example, by about several hundreds of μm.

It should be noted that the lens holder 33 may be rotated using a piezoelectric element, a coil, or a micrometer. This facilitates the distance between the fluorescent-light body layer 12 and the condensing lenses 31 and 32 to be finely adjusted.

1-2. Configuration of Light Source Device

Figure 5:
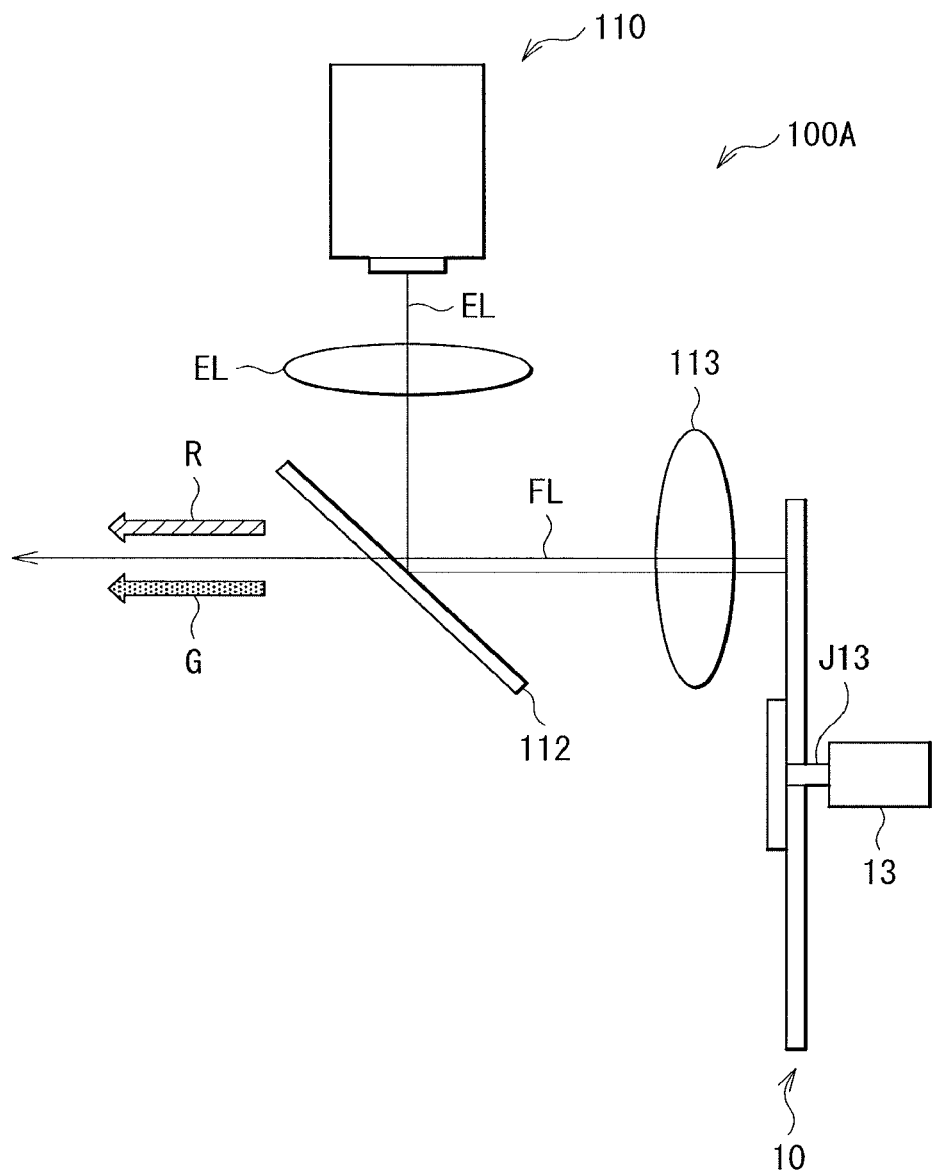
FIG. 5 is a schematic diagram illustrating a configuration example of a light source device including the fluorescent light body wheel illustrated in FIG. 1.

FIG. 5 is a schematic diagram illustrating an entire configuration of the light source device 100A The light source device 100A includes the fluorescent light body wheel 10, the light source section 110, condensing optical systems 111 and 113, and a dichroic mirror 112. The respective members included in the light source device 100A except for the light source section 110 are disposed on the optical path of the light (FL) emitted from the fluorescent light body wheel 10 in an order of the condensing optical system 113 and the dichroic mirror 112 from the fluorescent light body wheel 10 side. The light source section 110 is disposed at a position where the light source section 110 is opposed to the dichroic mirror 112 in a direction perpendicular to the optical path of the fluorescent light FL with the condensing optical system 111 disposed therebetween.

The light source section 110 includes a solid-state light-emitting element that outputs light with a predetermined wavelength. In the present embodiment, a semiconductor laser element that oscillates the excitation light EL (for example, blue laser light with a wavelength of 445 nm or 455 nm) is used as the solid-state light-emitting element. The excitation light EL is outputted from the light source section 110.

It should be noted that, in a case where the light source section 110 includes the semiconductor laser element, the light source section 110 may be configured to obtain the excitation light EL with a predetermined output using one semiconductor laser element, but may also be configured to combine respective pieces of lights emitted from a plurality of semiconductor laser elements to obtain the excitation light EL with a predetermined output. In addition, the wavelength of the excitation light EL is not limited to the numeric values described above. It is possible to use any wavelength that falls in a wavelength range of light called blue light.

The condensing optical system 111 gathers, in a predetermined spot diameter, the excitation light EL emitted from the light source section 110, and emits the excitation light EL toward the dichroic mirror 112.

The dichroic mirror 112 selectively reflects light in a predetermined wavelength range, and selectively transmits light in the other wavelength ranges. Specifically, the dichroic mirror 112 reflects, in a direction of the condensing optical system 113, blue light (excitation light EL) emitted from the light source section 110. In addition, the dichroic mirror 112 separates yellow light (fluorescent light FL) inputted from the fluorescent light body wheel 10 through the condensing optical system 113 into red light R and green light G, and inputs the red light R and the green light G to an illumination optical system 200 (described later).

The condensing optical system 113 gathers, in a predetermined spot diameter, the excitation light EL reflected by the dichroic mirror 112, and emits the gathered excitation light EL toward the fluorescent light body wheel 10. In addition, the condensing optical system 113 emits, toward the dichroic mirror 112, the fluorescent light FL emitted from the fluorescent light body wheel 10. It should be noted that the condensing optical system 113 is configured using the condensing lenses 31 and 32 described above.

It should be noted that the configuration of the light source device 100A illustrated in FIG. 5 is an example, but is not limited to this. For example, a polarization-type light source device may be configured in which, for example, a quarter wave length plate or the like is disposed between the light source section 110 and the fluorescent light body wheel 10.

1-3. Configuration of Projector

Figure 6:
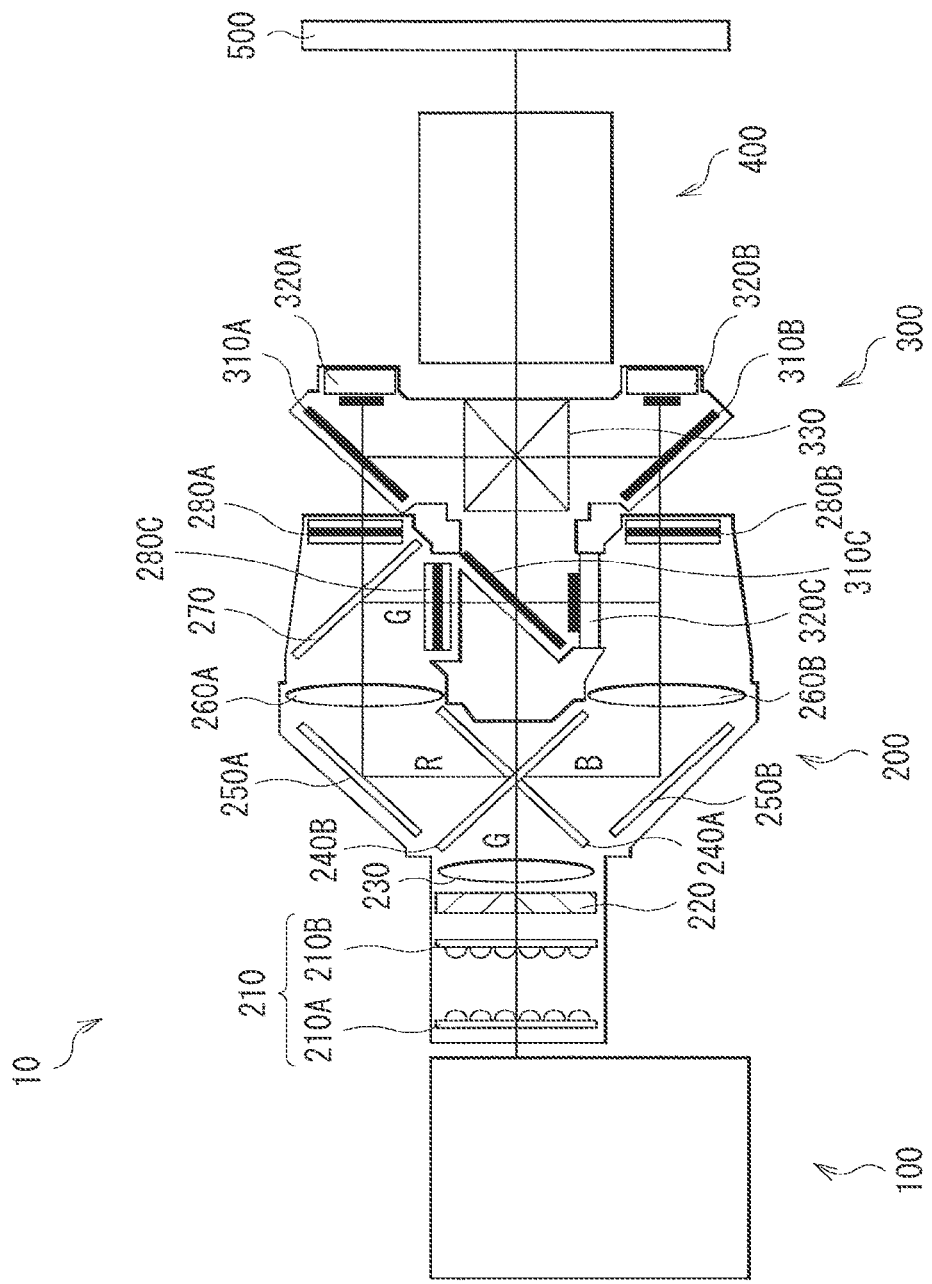
FIG. 6 is a schematic diagram illustrating a configuration example of a projector including the light source device illustrated in FIG. 5.

Next, a projection-type display (projector 1) according to the present disclosure is described. FIG. 6 is a schematic diagram illustrating an entire configuration of the projector 1 including the light source device 100A illustrated in FIG. 5 as a light-source optical system. It should be noted that, in the following description, a reflective 3LCD-type projector that performs light modulation using a reflective liquid crystal panel (LCD) is given as an example. It should be noted that, instead of the reflective liquid crystal panel, the fluorescent light body wheel 10 may also be applied to a projector using a transmissive liquid crystal panel, a digital micro-mirror device (DMD: Digital Micro-mirror Device), or the like.

As illustrated in FIG. 6, the projector 1 includes the light source device 100A described above, the illumination optical system 200, an image forming unit 300, and a projecting optical system 400 (projection optical system) in order.

The illumination optical system 200 includes, for example, fly eye lenses 210 (210A and 210B), a polarization conversion element 220, a lens 230, dichroic mirrors 240A and 240B, reflecting mirrors 250A and 250B, lenses 260A and 260B, a dichroic mirror 270, and polarizing plates 280A to 280C, from a position closer to the light source device 100A.

The fly eye lenses 210 (210A and 210B) are for achieving uniform distribution of illumination of white light from the light source device 100A. The polarization conversion element 220 functions to align a polarization axis of inputted light with a predetermined direction. For example, light other than p-polarization is converted into p-polarization. The lens 230 gathers light from the polarization conversion element 220, and directs the light toward the dichroic mirrors 240A and 240B. Each of the dichroic mirrors 240A and 240B selectively reflects light in a predetermined wavelength range, and selectively transmits light in the other wavelength ranges. For example, the dichroic mirror 240A mainly reflects red light toward the reflecting mirror 250A. In addition, the dichroic mirror 240B mainly reflects blue light toward the reflecting mirror 250B. Thus, green light mainly passes through both of the dichroic mirrors 240A and 240B, and travels toward a reflective polarizing plate 310C (described later) of the image forming unit 300. The reflecting mirror 250A reflects light (mainly red light) from the dichroic mirror 240A toward the lens 260A. The reflecting mirror 250B reflects light (mainly blue light) from the dichroic mirror 240B toward the lens 260B. The lens 260A transmits light (mainly red light) from the reflecting mirror 250A, gathers the light on the dichroic mirror 270. The lens 260B transmits light (mainly blue light) from the reflecting mirror 250B, gathers the light on the dichroic mirror 270. The dichroic mirror 270 selectively reflects green light and selectively transmit light in the other wavelength ranges. Here, the dichroic mirror 270 transmits a red light component of light from the lens 260A. In a case where the light from the lens 260A contains a green light component, the green light component is reflected toward the polarizing plate 280C. The polarizing plates 280A to 280C each include a polarizer having a polarization axis in a predetermined direction. For example, in a case of conversion into p-polarization in the polarization conversion element 220, the polarizing plates 280A to 280C transmit light of p-polarization, and reflect light of s-polarization.

The image forming unit 300 includes reflective polarizing plates 310A to 310C, reflective liquid crystal panels 320A to 320C (optical modulation elements), and a dichroic prism 330.

The reflective polarizing plates 310A to 310C respectively transmit respective pieces of light (for example, p-polarization) having the same polarization axes as the polarization axes of the respective pieces of polarized light from the polarizing plates 280A to 280C, and reflect light (s-polarization) having the other polarization axes. Specifically, the reflective polarizing plate 310A transmits red light of p-polarization from the polarizing plate 280A in a direction of the reflective liquid crystal panel 320A. The reflective polarizing plate 310B transmits blue light of p-polarization from the polarizing plate 280B in a direction of the reflective liquid crystal panel 320B. The reflective polarizing plate 310C transmits green light of p-polarization from the polarizing plate 280C in a direction of the reflective liquid crystal panel 320C. In addition, the green light of p-polarization that has passed through both of the dichroic mirrors 240A and 240B and entered the reflective polarizing plate 310C directly passes through the reflective polarizing plate 310C, and enters the dichroic prism 330. Furthermore, the reflective polarizing plate 310A reflects red light of s-polarization from the reflective liquid crystal panel 320A, and causes the red light of s-polarization to enter the dichroic prism 330. The reflective polarizing plate 310B reflects blue light of s-polarization from the reflective liquid crystal panel 320B, and causes the blue light of s-polarization to enter the dichroic prism 330. The reflective polarizing plate 310C reflects green light of s-polarization from the reflective liquid crystal panel 320C, and causes the green light of s-polarization to enter the dichroic prism 330.

The reflective liquid crystal panels 320A to 320C respectively perform spatial modulation of red light, blue light, or green light.

The dichroic prism 330 combines the inputted red light, blue light, and green light, and emits the combined light toward the projecting optical system 400.

The projecting optical system 400 includes, for example, a plurality of lenses or the like, although not illustrated. The projecting optical system 400 enlarges light emitted from the image forming unit 300 to project the light onto a screen 500.

1-4. Workings and Effects

As described above, the projector includes various lenses disposed on the optical path of light emitted from the light source. Of these, the relative positions of the fluorescent light body and a condensing lens group that gathers light emitted from the light source onto the fluorescent light body have particularly great influence on luminance of a projector. A typical projector improves luminance by increasing the precision of parts. However, managing luminance of a projector using the precision of parts is likely to lead to a decrease in luminance due to variation of parts. In addition, this leads to an increase in cost. Furthermore, the fluorescent light body has an uneven surface. Thus, managing luminance of a projector using dimensions of parts has been difficult.

Meanwhile, in the present embodiment, the lens-position adjusting mechanism that is able to make fine adjustment is provided to control the distance between the fluorescent-light body layer 12 provided on the fluorescent light body wheel 10 and the condensing lens group (condensing lenses 31 and 32). Specifically, the housing 21 that accommodates the fluorescent light body wheel 10 and the lens holder 33 that holds the condensing lenses 31 and 32 are provided with the threads 21X and 33X that fit each other. This makes it possible to adjust the distance between the fluorescent-light body layer 12 provided on the fluorescent light body wheel 10 and the condensing lenses 31 and 32, for example, by adjusting the amount of rotation of the lens holder 33 when the lens holder 33 is fastened to the housing 21. In other words, it is possible to achieve optimization of the relative positions of the fluorescent-light body layer 12 and the condensing lenses 31 and 32.

As described above, in the light source device 100A according to the present embodiment, the housing 21 that accommodates the fluorescent light body wheel 10 and the lens holder 33 that holds the condensing lenses 31 and 32 are provided with the threads 21X and 33X that fit each other. For example, when the lens holder 33 is fastened to the housing 21, the amount of rotation of the lens holder 33 is adjusted to make it possible to finely adjust the positions of the lenses. This makes it possible to optimize the relative positions of the fluorescent-light body layer 12 and the condensing lens 31, 32, and provide the light source device 100A having high luminance and the projector 1 including the light source device 100A.

Furthermore, in the present embodiment, the distance between the fluorescent-light body layer 12 and the condensing lenses 31 and 32 is mechanically adjusted as described above. This makes it possible to absorb variations of parts, and easily achieve optimization of the relative positions of the fluorescent-light body layer 12 and the condensing lenses 31 and 32.

In addition, in the present embodiment, even if the precision of parts is reduced, it is possible to adjust the condensing lenses 31 and 32 at the most favorable relative positions with respect to the fluorescent-light body layer 12. This makes it possible to reduce cost.

Moreover, in the present embodiment, the wave washer 36 is disposed between the housing 21 and the press portion 33B of the lens holder 33. This makes it possible to easily fix the condensing lenses 31 and 32 at the most favorable relative positions with respect to the fluorescent-light body layer 12. In addition, pressure is constantly applied in a certain direction, and thus, fixation using the wave washer 36 is less likely to be influenced from a backlash. Furthermore, fixation is achieved with pressure, and thus it is possible to easily perform re-adjustment of the positions of lenses.

Next, a second embodiment and modification examples 1 to 7 are described. The following attaches the same reference characters to components similar to those in the first embodiment described above, and omits description thereof as appropriate.

2. Modification Examples

2-1. Modification Example 1

Figure 7:
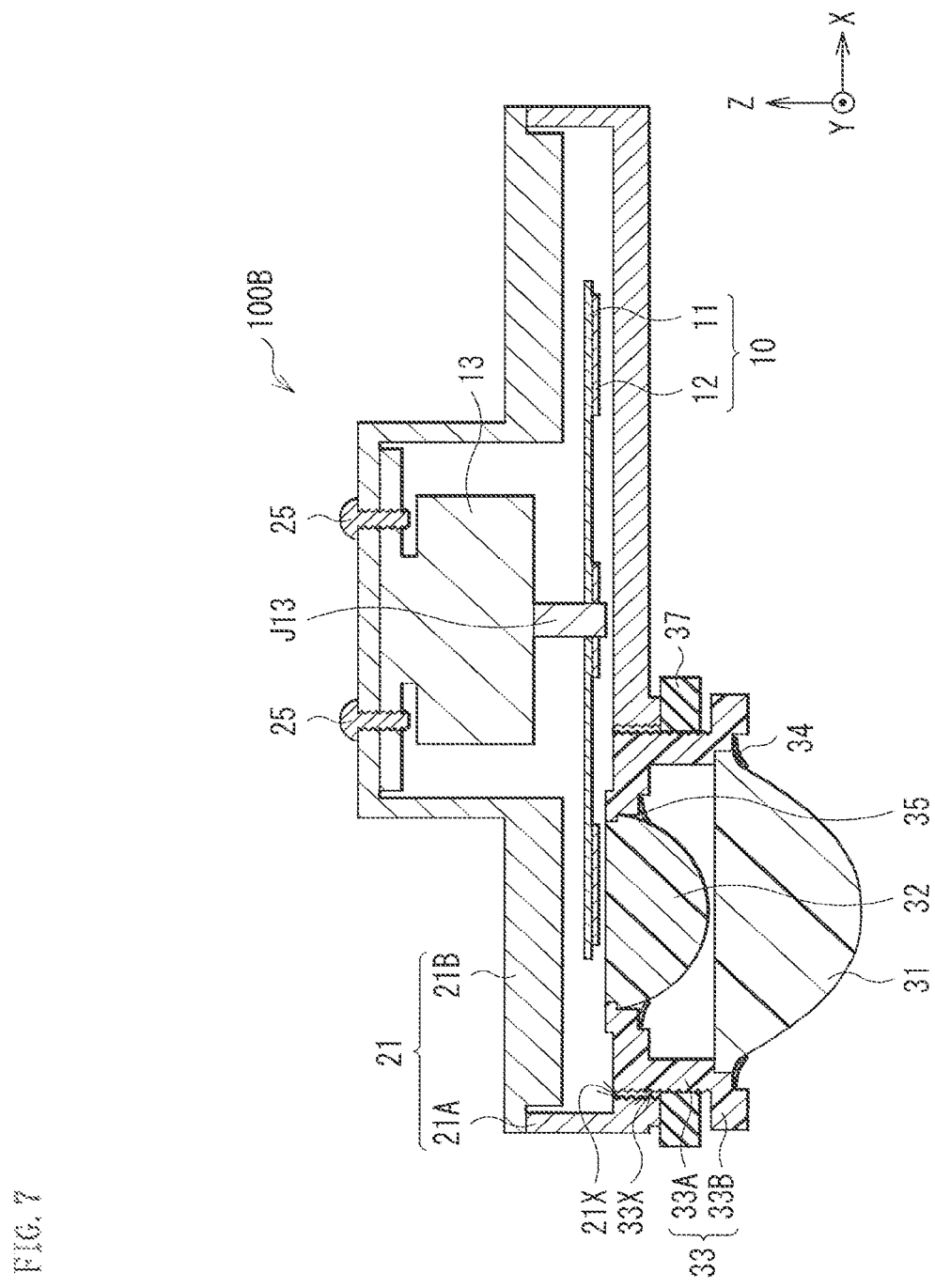
FIG. 7 is a schematic cross-sectional view of a configuration of a fluorescent light body wheel and surrounding member thereof included in a light source device according to a modification example 1 of the present disclosure.

FIG. 7 schematically illustrates a cross-sectional configuration of the fluorescent light body wheel 10 and surrounding members thereof included in a light source device 100B according to a modification example (modification example 1) of the first embodiment of the present disclosure. This light source device 100B is included, for example, in the projector 1 as with the light source device 100A described above. The light source device 100B according to the present modification example differs from the first embodiment described above in that a lock nut 37 is disposed between the housing 21 and the press portion 33B of the lens holder 33, and fixation is performed using the lock nut 37 after the adjustment of lens positions of the condensing lenses 31 and 32 with respect to the fluorescent-light body layer 12.

In a lens-position adjusting mechanism using the lock nut 37, after the adjustment of lens positions of the condensing lenses 31 and 32 with respect to the fluorescent-light body layer 12, the lock nut 37 is rotated to come into contact with the housing 21. This applies pressure to the thread 33X of the lens holder 33 to perform fixation. In addition, since fixation is performed with pressure, it is possible to easily perform re-adjustment of lens positions, as in a case where the wave washer 36 is used.

2-2. Modification Example 2

Figure 8:
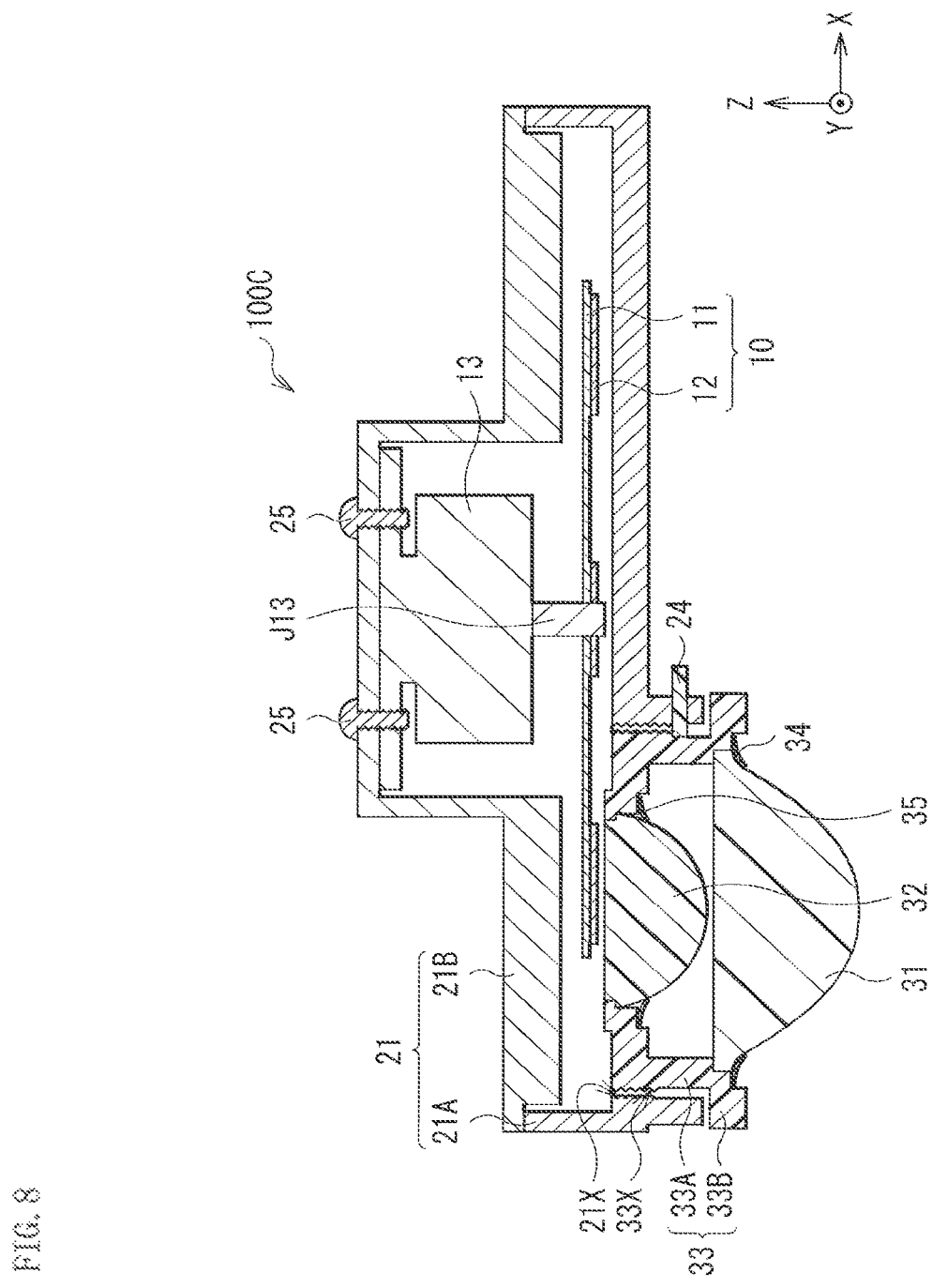
FIG. 8 is a schematic cross-sectional view of a configuration of a fluorescent light body wheel and surrounding member thereof included in a light source device according to a modification example 2 of the present disclosure.

FIG. 8 schematically illustrates a cross-sectional configuration of the fluorescent light body wheel 10 and surrounding members thereof included in a light source device 100C according to a modification example (modification example 2) of the first embodiment of the present disclosure. This light source device 100C is included, for example, in the projector 1 as with the light source device 100A or the like described above. The light source device 100C according to the present modification example differs from the first embodiment described above in that a setscrew 24 is used to perform fixation after the adjustment of lens positions of the condensing lenses 31 and 32 with respect to the fluorescent-light body layer 12.

In a lens-position adjusting mechanism using the setscrew 24, after the adjustment of lens positions of the condensing lenses 31 and 32 with respect to the fluorescent-light body layer 12, the setscrew 24 attached to the side surface of the opening 21H of the housing 21 is rotated to come into contact with the side surface of the lens holder 33 inserted into the opening 21H. This applies pressure to the lens holder 33 to perform fixation.

2-3. Modification Example 3

Figure 9:
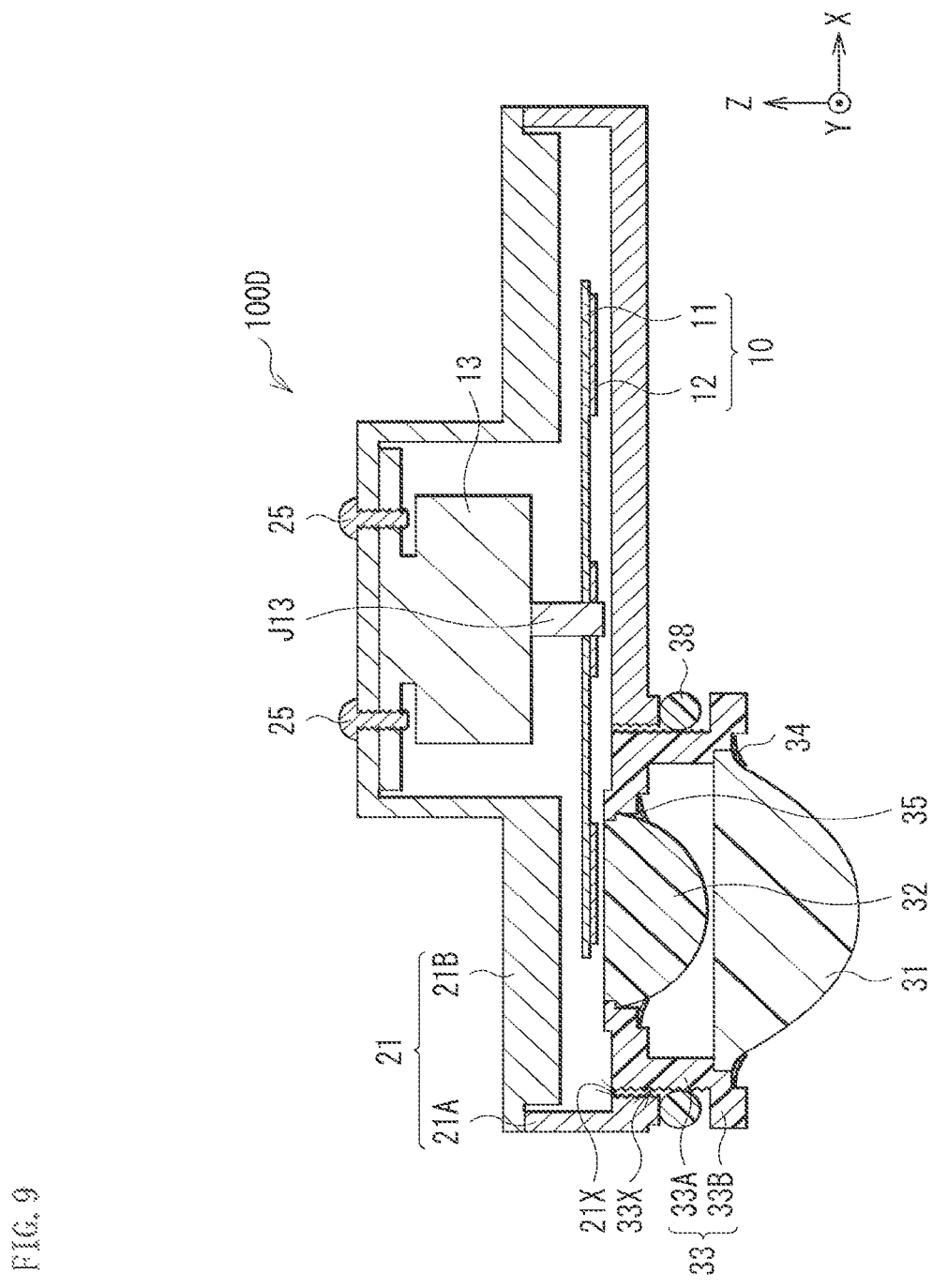
FIG. 9 is a schematic cross-sectional view of a configuration of a fluorescent light body wheel and surrounding member thereof included in a light source device according to a modification example 3 of the present disclosure.

FIG. 9 schematically illustrates a cross-sectional configuration of the fluorescent light body wheel 10 and surrounding members thereof included in a light source device 100D according to a modification example (modification example 3) of the first embodiment of the present disclosure. This light source device 100D is included, for example, in the projector 1 as with the light source device 100A or the like described above. The light source device 100D according to the present modification example differs from the first embodiment described above in that an adhesive 38 is used to perform fixation after the adjustment of lens positions of the condensing lenses 31 and 32 with respect to the fluorescent-light body layer 12.

In a lens-position adjusting mechanism using the adhesive 38, after the adjustment of lens positions of the condensing lenses 31 and 32 with respect to the fluorescent-light body layer 12, the side surface of the opening 21H of the housing 21 and the side surface of the fitting portion 33A of the lens holder 33 are bonded together using the adhesive 38. This fixes positions of the condensing lenses 31 and 32 with respect to the fluorescent-light body layer 12.

2-4. Modification Example 4

Figure 10:
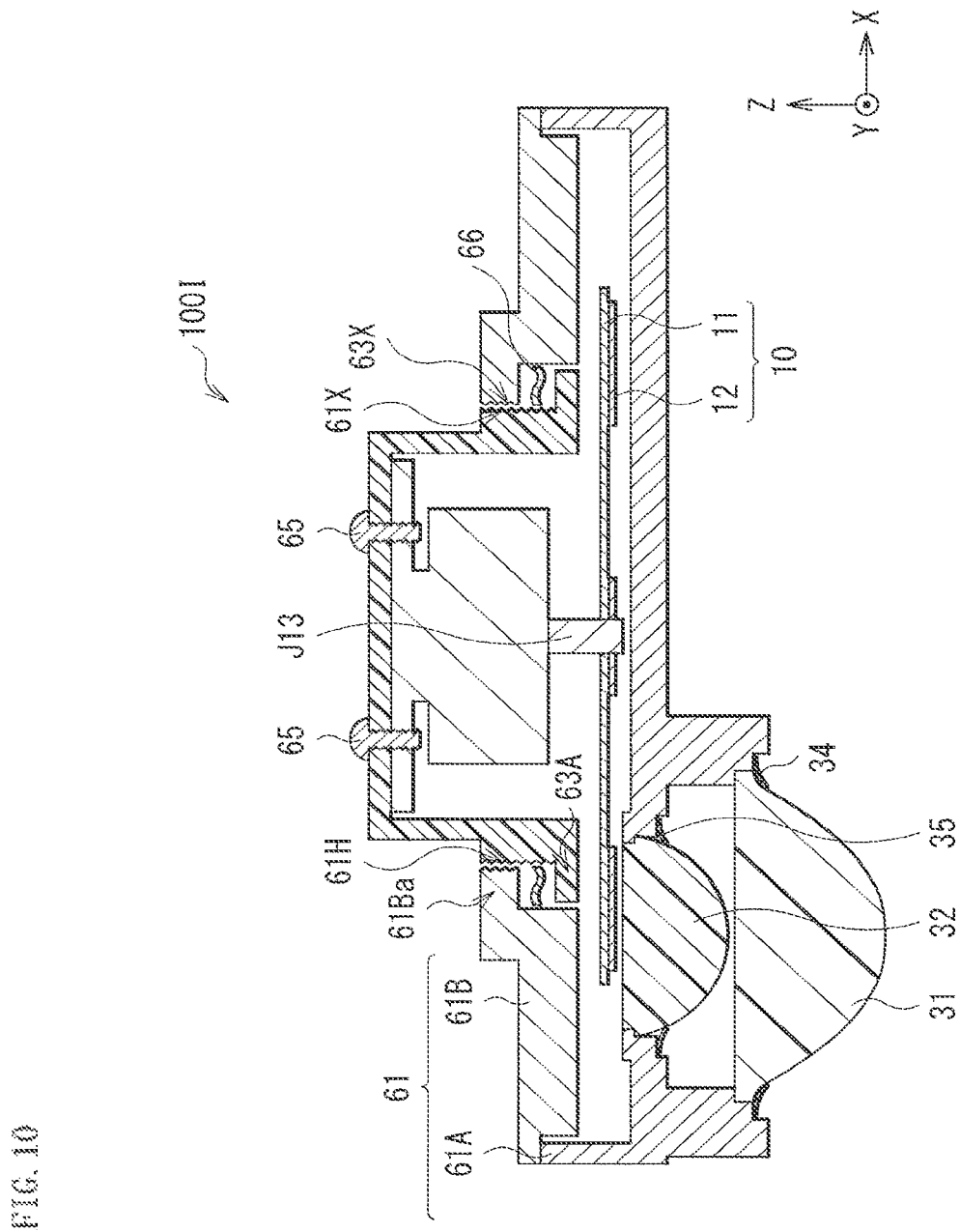
FIG. 10 is a schematic cross-sectional view of a configuration of a fluorescent light body wheel and surrounding member thereof included in a light source device according to a modification example 4 of the present disclosure.

FIG. 10 schematically illustrates a cross-sectional configuration of the fluorescent light body wheel 10 and surrounding members thereof included in a light source device 100I according to a modification example (modification example 4) of the first embodiment of the present disclosure. This light source device 100I is included, for example, in the projector 1 as with the light source device 100A or the like described above. The light source device 100I according to the present modification example differs from the first embodiment described above in that the lens-position adjusting mechanism includes a housing 61 and a motor holder 63 in which the motor 13 of the fluorescent light body wheel 10 is fixed using, for example, a fixing screw 65.

More specifically, the lens-position adjusting mechanism includes threads 61X and 63X respectively provided on a rear cover 61B of the housing 61 and the motor holder 63 attached to the rear cover 61B of the housing 61. The threads 61X and 63X fit each other. In addition, a wave washer 66 is disposed between the rear cover 61B and the motor holder 63, specifically, between a press portion 61Ba of the rear cover 61B and a press portion 63A of the motor holder 63. The press portion 61Ba and the press portion 63A are opposed to each other. This fixes the distance between the fluorescent light body wheel 10 and the condensing lenses 31 and 32.

The housing 61 includes, for example, a front cover 61A that covers a front surface of the fluorescent light body wheel 10, and the rear cover 61B that covers a portion of a back surface of the fluorescent light body wheel 10. The rear cover 61B has an opening 61H for fitting. The motor holder 63 is fitted into the opening 61H. The thread 61X is formed on the side surface thereof. In the present modification example, the motor holder 63 is fitted into the opening 61H.

Rotating the motor holder 63 causes the fluorescent light body wheel 10 coupled to the motor 13 to move in the Z-axis direction.

As described above, the light source device 100I according to the present modification example has the opening 61H on the rear cover 61B of the housing 61, and includes the threads 61X and 63X provided on the respective side surfaces thereof. The motor holder 63 is fitted into the opening 61H. The threads 61X and 63X fit each other. With this configuration, fitting the motor holder 63 into the opening 61H and rotating the motor holder 63 cause the fluorescent light body wheel 10 to move in the Z-axis direction, making it possible to optimize the relative positions of the fluorescent-light body layer 12 and the condensing lenses 31 and 32. In addition, the wave washer 66 is disposed between the press portions 61Ba and 63A respectively provided on the rear cover 61B and the motor holder 63. This makes it possible to easily fix the condensing lenses 31 and 32 at the most favorable relative positions with respect to the fluorescent-light body layer 12. Thus, the present modification example attains an effect similar to that of the light source device 100A according to the first embodiment described above.

3. Second Embodiment

Figure 11:
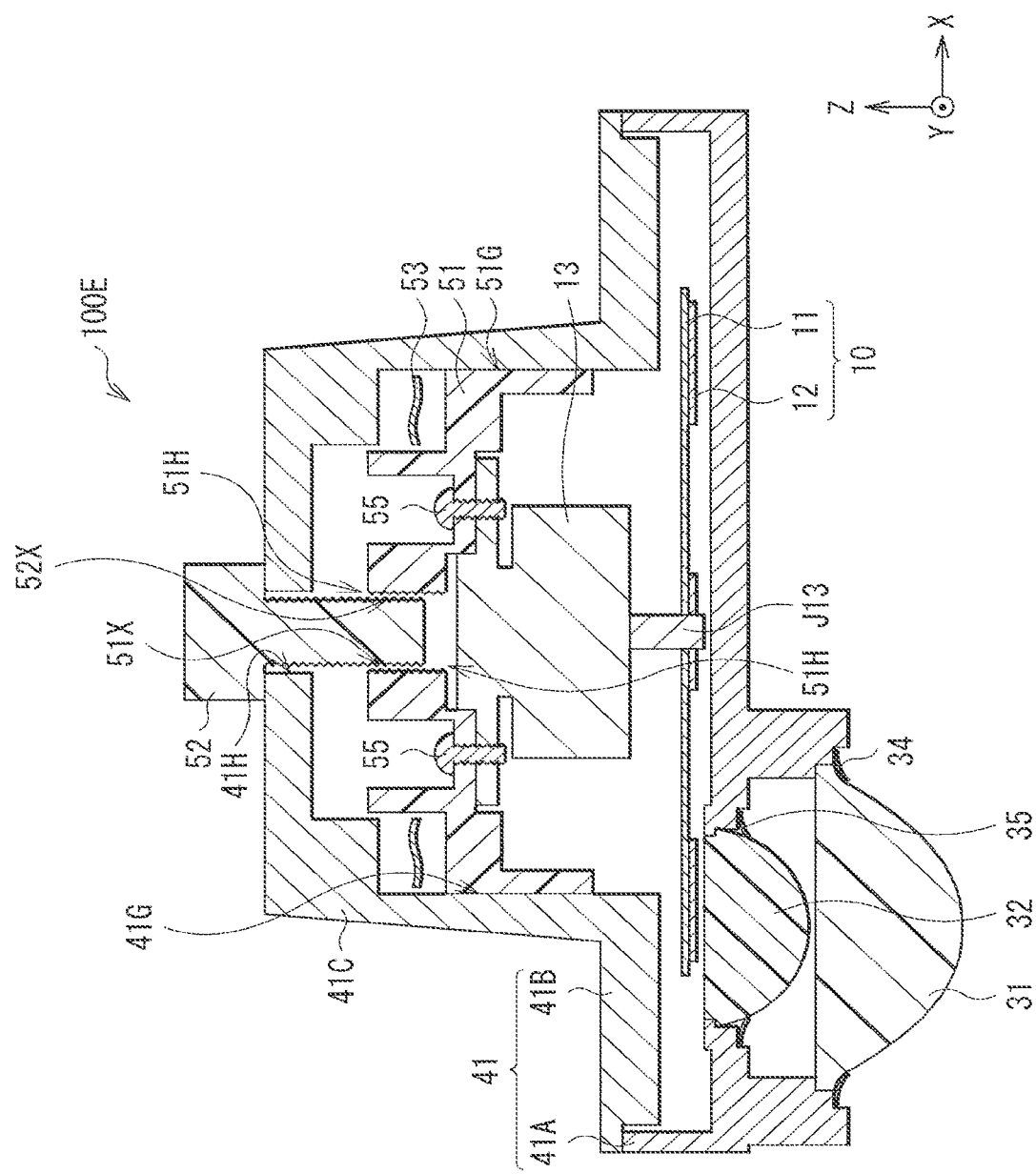
FIG. 11 is a schematic cross-sectional view of one example of a configuration of a fluorescent light body wheel and surrounding member thereof included in a light source device according to a second embodiment of the present disclosure.
Figure 12:
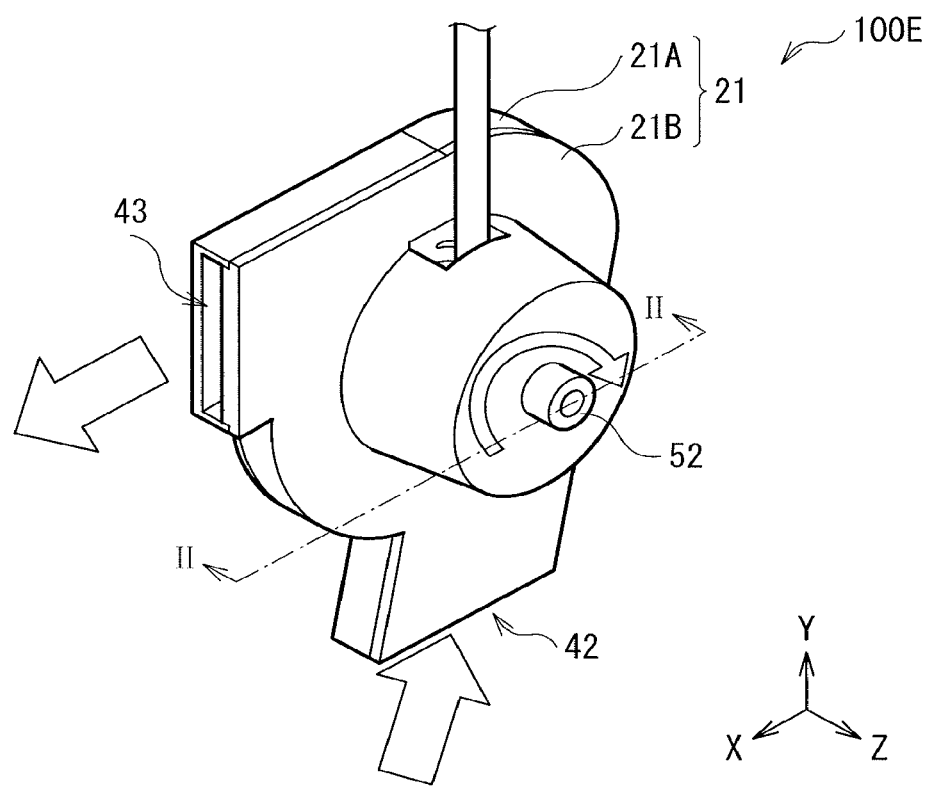
FIG. 12 is a perspective view of the fluorescent light body wheel and surrounding member thereof illustrated in FIG. 11.
Figure 13:
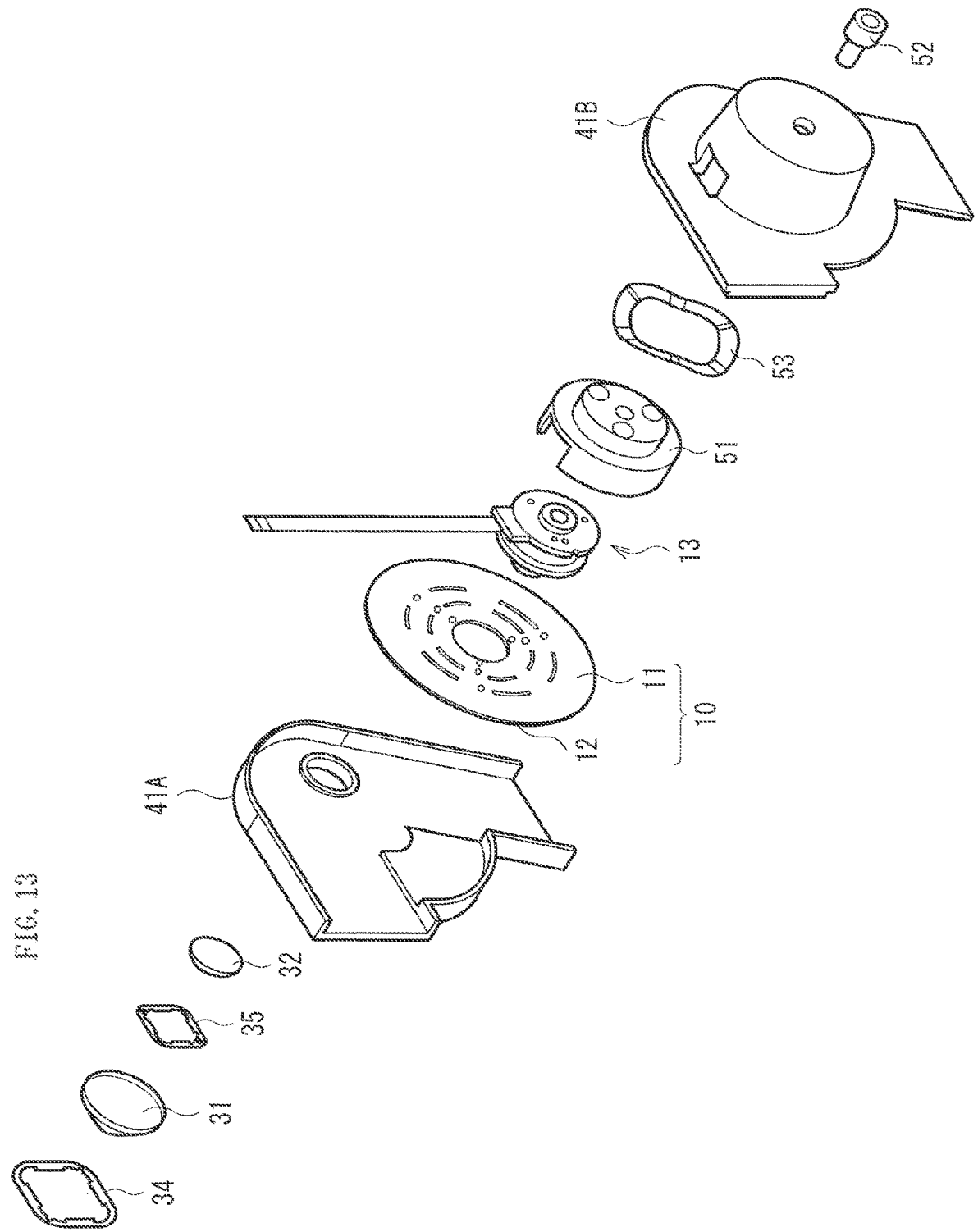
FIG. 13 is an exploded perspective view of the fluorescent light body wheel and surrounding member thereof illustrated in FIG. 11.

FIG. 11 is a diagram schematically illustrating one example of a cross-sectional configuration of a rotating body (fluorescent light body wheel 10) and surrounding members thereof included in a light source device (light source device 100E) according to a second embodiment of the present disclosure. FIG. 12 is a perspective view, from a back surface side, of the configuration of the fluorescent light body wheel 10 and surrounding members thereof illustrated in FIG. 11. FIG. 11 is a diagram illustrating a cross section taken along the line II-II in FIG. 12. FIG. 13 is an exploded perspective view of the fluorescent light body wheel 10 and surrounding members thereof illustrated in FIGS. 11 and 12. This light source device 100E is included, for example, in the projector 1 as with the light source device 100A described above. In the light source device 100E according to the present embodiment, a lens-position adjusting mechanism includes a thread 51X provided on a motor holder 51, and a feed screw 52 including a thread 52X corresponding to this thread 51X.

3-1. Configuration of Lens-Position Adjusting Mechanism

The fluorescent light body wheel 10 included in the light source device 100E is accommodated, for example, in a motor accommodating section 41C of a housing 41 together with the motor 13. In the present embodiment, the motor holder 51 that supports the motor 13 and holds the motor 13 in the housing 41 is attached to the motor 13. This motor holder 51 and the motor accommodating section 41C are in a fitting relationship. This enables the motor holder 51 to move within the motor accommodating section 41C in a direction (for example, Z-axis direction) perpendicular to the optical axis. Specifically, the motor holder 51 has an opening 51H having the thread 51X on a side surface thereof. The feed screw 52 that is fitted with this opening 51H and includes the thread 52X corresponding to the thread 51X is rotated, for example, from the outside of the housing 41. This causes the motor holder 51 to moves within the motor accommodating section 41C, adjusting the distance between the condensing lenses 31 and 32 and the fluorescent light body wheel 10 including the fluorescent-light body layer 12.

The housing 41 includes, for example, a front cover 41A that covers a front surface of the fluorescent light body wheel 10, and the rear cover 41B that covers a back surface of the fluorescent light body wheel 10. The front cover 41A is integrated, for example, with the condensing lenses 31 and 32. The rear cover 41B includes the motor accommodating section 41C that accommodates the motor holder 51 as described above. The motor accommodating section 41C includes, therein, a guiding portion 41G that accommodates the motor holder 51 and guides movement of the motor holder 51 in the Z-axis direction. Specifically, the guiding portion 41G (the inner diameter of the motor accommodating section 41C) fits the outer diameter (outer side surface) of the motor holder 51. This makes it possible for the motor holder 51 to move only in the Z-axis direction, suppressing a displacement of an irradiated position with the excitation light EL in a planar direction. The motor accommodating section 41C of the rear cover 41B has an opening 41H into which the feed screw 52 is inserted. In addition, the housing 41 has an inflow port 42 and a discharging port 43 for cooling blow that cools the fluorescent light body wheel 10, as with the housing 21 in the first embodiment.

The motor holder 51 holds the motor 13 that drives the fluorescent light body wheel 10 as described above. The motor 13 is fixed to the motor holder 51, for example, using a fixing screw 55. The outer diameter (outer side surface) of the motor holder 51 fits the guiding portion 41G of the motor accommodating section 41C as a guided portion 51G. In other words, in the light source device 100E according to the present embodiment, the motor holder 51 is accommodated in the motor accommodating section 41C of the housing 41, making it possible to move the motor holder 51 only in a direction (for example, the Z-axis direction) perpendicular to the optical axis. This suppresses a displacement of an irradiated position with the excitation light EL in a planar direction, making it possible to accurately adjust the position of the fluorescent-light body layer 12 with respect to the condensing lenses 31 and 32. The back surface of the motor holder 51 has the opening 51H. This opening 51H fits the feed screw 52 that moves the motor holder 51 in the Z-axis direction within the motor accommodating section 41C. The opening 51H has the thread 51X on a side surface thereof. The thread 51X corresponds to the thread 52X formed on the feed screw 52.

Furthermore, a wave washer 53 is disposed between the back surface of the motor holder 51 within the housing 41 and the rear cover 41B.

Figure 14:
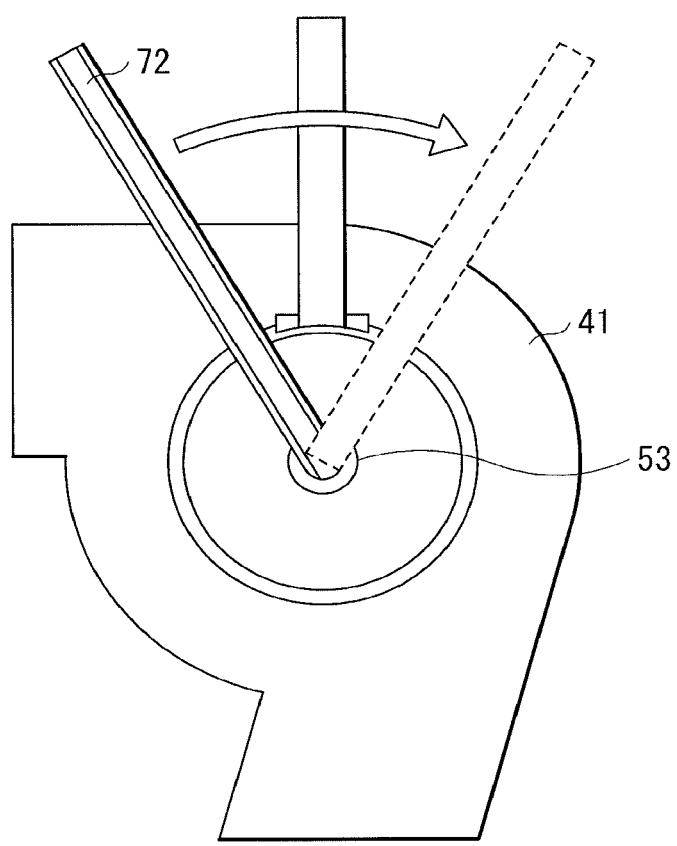
FIG. 14 is a schematic diagram describing a method of adjusting a distance between a fluorescent light body wheel and a condensing lens group in the fluorescent light body wheel and surrounding member thereof illustrated in FIG. 11.
Figure 13:
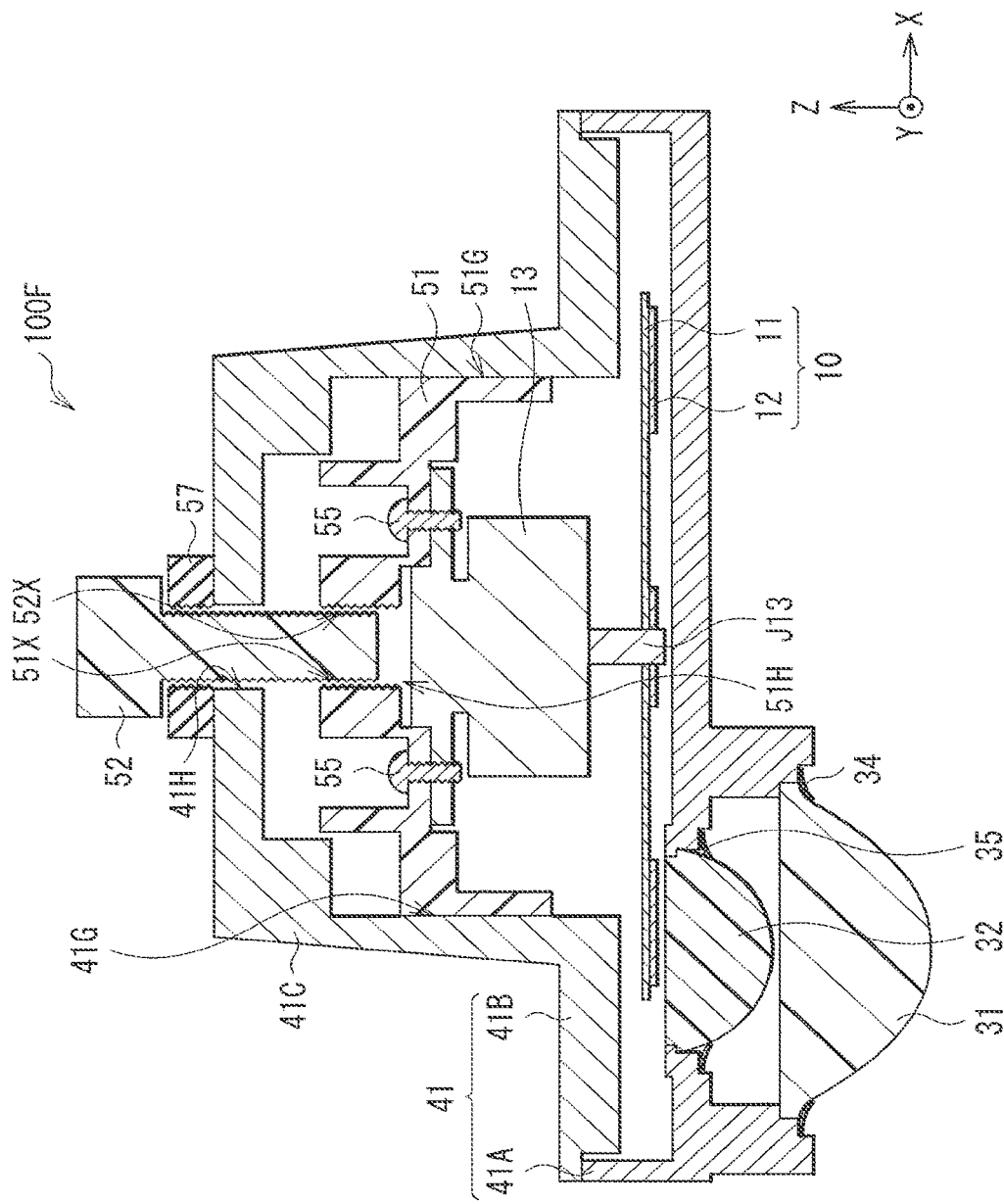

The lens-position adjusting mechanism according to the present embodiment includes the threads 51X and 52X respectively provided on the side surface of the opening 51H and the side surface of the feed screw 52. In the present embodiment, the feed screw 52 is rotated, for example, using a jig 72, for example, in an arrowed direction illustrated in each of FIGS. 12 and 14 to move the motor holder 51 along the side surface of the motor accommodating section 41C. This allows the fluorescent light body wheel 10 coupled to the motor 13 to move, for example, in the Z-axis direction, making it possible to finely adjust the distance between the fluorescent-light body layer 12 on the fluorescent light body wheel 10 and the condensing lenses 31 and 32. In addition, the wave washer 53 is disposed between the back surface of the motor holder 51 within the housing 41 and the rear cover 41B. This wave washer 53 fixes the distance between the fluorescent-light body layer 12 and the condensing lenses 31 and 32 after positions of the lenses are adjusted. Thus, a positional displacement of the motor holder 51 is suppressed. The positional displacement of the motor holder 51 may be caused by vibration or the like of rotation of the fluorescent light body wheel 10.

3-2. Workings and Effects

As described above, in the light source device 100E according to the present embodiment, the housing 41 includes the motor accommodating section 41C. In addition, the motor holder 51 moves along the side surface of this motor accommodating section 41C, for example, in the Z-axis direction. Specifically, the motor holder 51 has the opening 51H on a back surface thereof. The feed screw 52 is fitted into the opening 51H. The feed screw 52 moves the motor holder 51 in the Z-axis direction within the motor accommodating section 41C. The side surface of the opening 51H and the feed screw 52 include the threads that correspond to each other. Rotating the feed screw 52, for example, from the outside of the housing 41 moves the motor holder 51 along the side surface of the motor accommodating section 41C. This makes it possible to finely adjust, in the Z-axis direction, the fluorescent light body wheel 10 having the fluorescent-light body layer 12 with respect to the condensing lenses 31 and 32, optimizing the relative positions of the fluorescent-light body layer 12 and the condensing lenses 31 and 32. In other words, the light source device 100E according to the present embodiment attains an effect similar to that of the light source device 100A according to the first embodiment described above.

Furthermore, in the present embodiment, the wave washer 53 is disposed between the back surface of the motor holder 51 within the housing 41 and the rear cover 41B. Thus, as in the first embodiment, it is possible to easily fix the condensing lenses 31 and 32 at the most favorable relative positions with respect to the fluorescent-light body layer 12.

4. Modification Examples

4-1. Modification Example 5

FIG. 15 schematically illustrates a cross-sectional configuration of the fluorescent light body wheel 10 and surrounding members thereof included in a light source device 100F according to a modification example (modification example 5) of the second embodiment of the present disclosure. This light source device 100F is included, for example, in the projector 1 as with the light source device 100A described above. The light source device 100F according to the present modification example differs from the second embodiment described above in that a lock nut 57 is disposed between the housing 41 and the feed screw 52, and this lock nut 57 is used for fixation after the adjustment of lens positions of the fluorescent-light body layer 12 with respect to the condensing lenses 31 and 32.

In a lens-position adjusting mechanism using the lock nut 57, after the adjustment of lens positions of the condensing lenses 31 and 32 with respect to the fluorescent-light body layer 12, the lock nut 57 is rotated to come into contact with the rear cover 41B of the housing 41. This applies pressure to the thread 52X of the feed screw 52 to perform fixation. In addition, since fixation is performed with pressure, it is possible to easily perform re-adjustment of lens positions, as in a case where the wave washer 53 is used.

4-2. Modification Example 6

Figure 16:
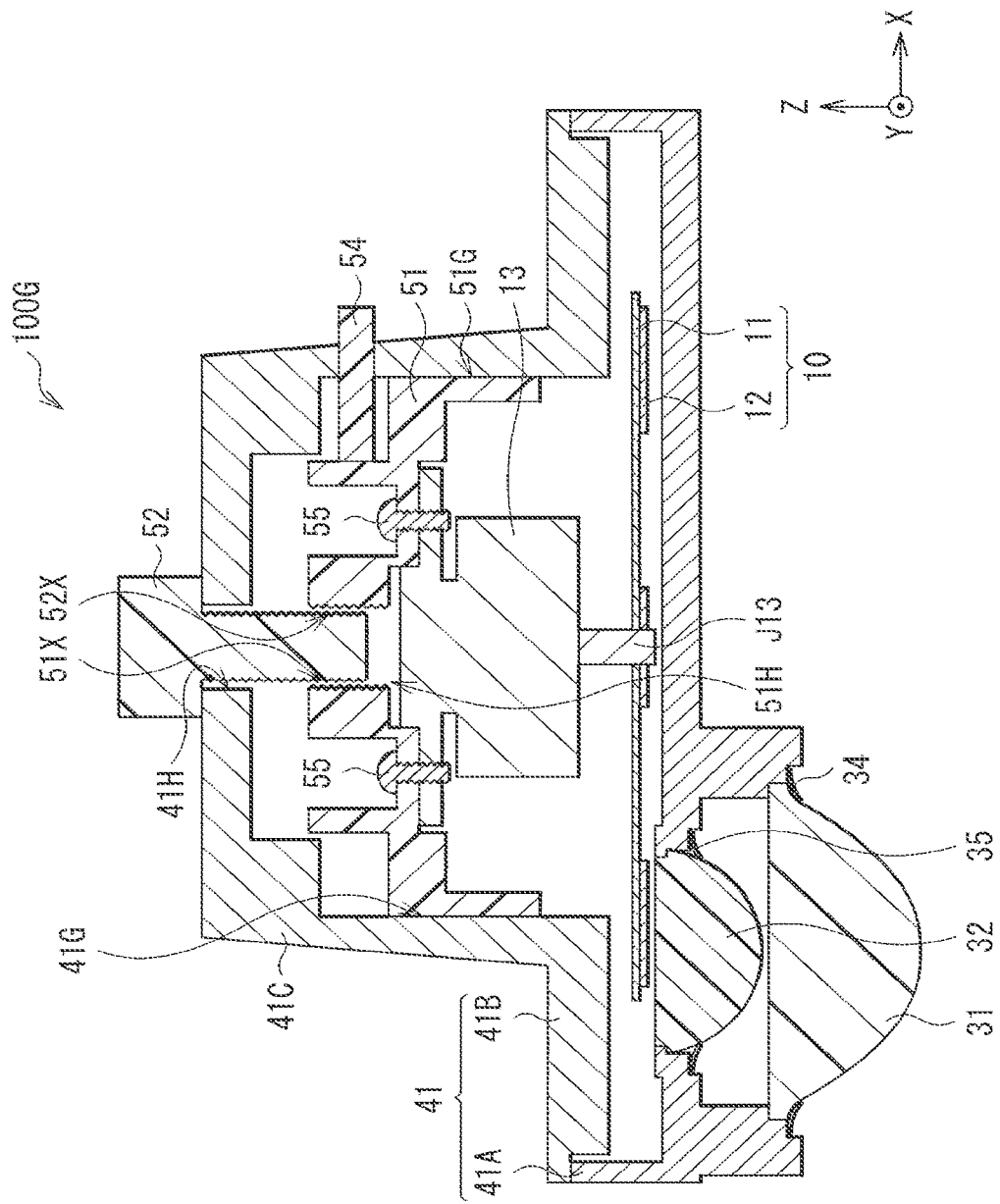
FIG. 16 is a schematic cross-sectional view of a configuration of a fluorescent light body wheel and surrounding member thereof included in a light source device according to a modification example 6 of the present disclosure.

FIG. 16 schematically illustrates a cross-sectional configuration of the fluorescent light body wheel 10 and surrounding members thereof included in a light source device 100G according to a modification example (modification example 6) of the second embodiment of the present disclosure. This light source device 100G is included, for example, in the projector 1 as with the light source device 100A or the like described above. The light source device 100G according to the present modification example differs from the second embodiment described above in that a setscrew 54 is used to perform fixation after the adjustment of lens positions of the fluorescent-light body layer 12 with respect to the condensing lenses 31 and 32.

In a lens-position adjusting mechanism using the setscrew 54, after the adjustment of lens positions of the condensing lenses 31 and 32 with respect to the fluorescent-light body layer 12, the setscrew 54 attached to the side surface of the motor accommodating section 41C of the housing 41 is rotated to come into contact with the motor holder 51 accommodated in the motor accommodating section 41C. This applies pressure to the motor holder 51 to perform fixation.

4-3. Modification Example 7

Figure 17:
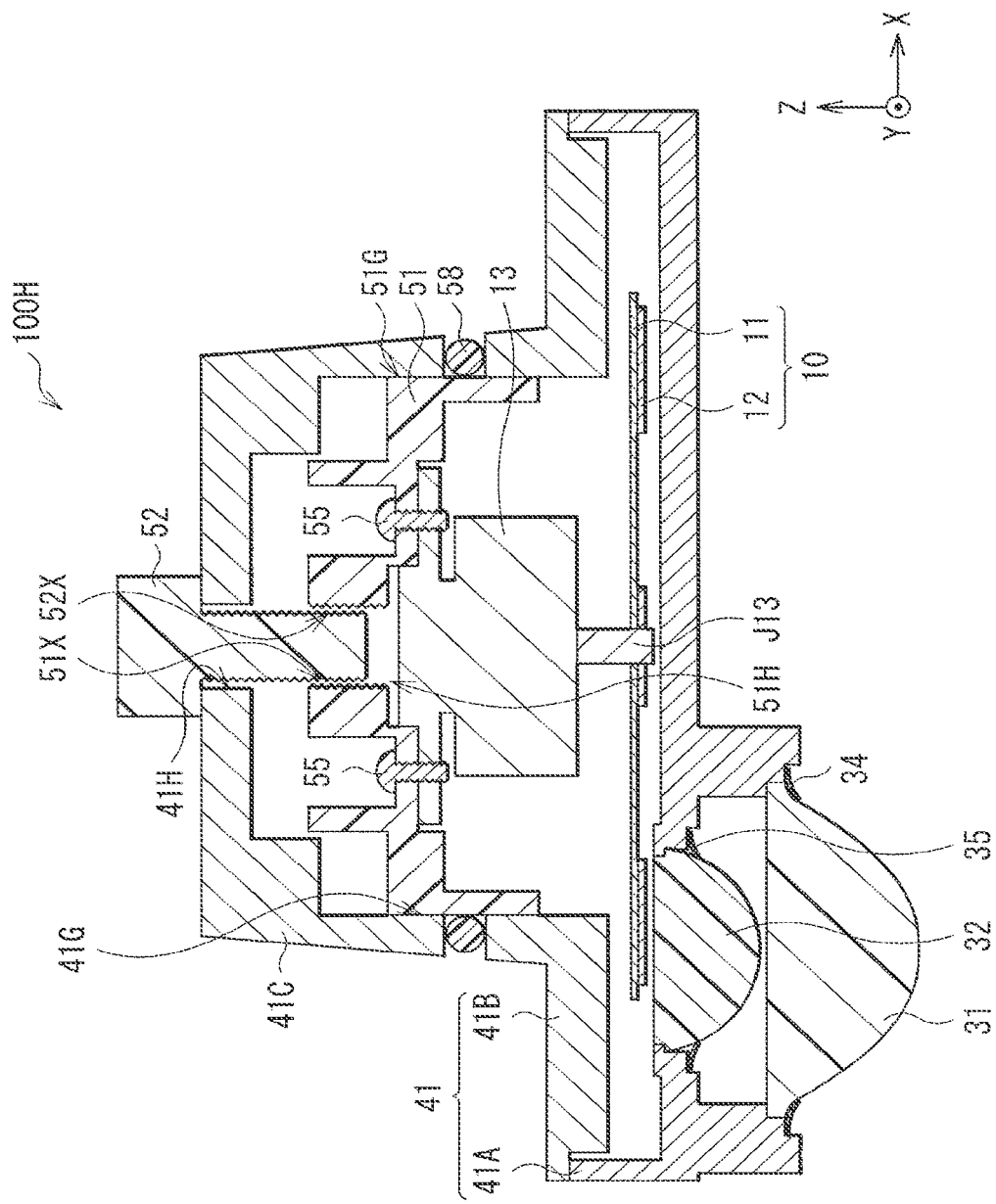
FIG. 17 is a schematic cross-sectional view of a configuration of a fluorescent light body wheel and surrounding member thereof included in a light source device according to a modification example 7 of the present disclosure.

FIG. 17 schematically illustrates a cross-sectional configuration of the fluorescent light body wheel 10 and surrounding members thereof included in a light source device 100H according to a modification example (modification example 7) of the second embodiment of the present disclosure. This light source device 100H is included, for example, in the projector 1 as with the light source device 100A or the like described above. The light source device 100H according to the present modification example differs from the second embodiment described above in that an adhesive 58 is used to perform fixation after the adjustment of lens positions of the fluorescent-light body layer 12 with respect to the condensing lenses 31 and 32.

In a lens-position adjusting mechanism using the adhesive 58, after the adjustment of lens positions of the fluorescent-light body layer 12 with respect to the condensing lenses 31 and 32, the adhesive 58 is used to bond the motor holder 51 within the motor accommodating section 41C. This fixes the position of the fluorescent-light body layer 12 with respect to the condensing lenses 31 and 32.

The present disclosure has been described above with reference to the first and second embodiments and the modification examples 1 to 7. The present disclosure is not, however, limited to the embodiment or the like described above. A variety of modifications may be made. For example, configuration may be possible by using things other than the members described in the embodiments described above.

For example, although the wave washers 36 and 53 are used in the first and second embodiments described above to perform fixation after the adjustment of lens positions, the wave washers 36 and 53 are replaceable with members each having a spring property such as coil springs or anti-loosening washers. Examples of such a member include a spring lock washer, a conical spring washer, a nord-lock washer, and the like. In addition, the lock nuts 37 and 57 are used in the modification examples 1 and 5 described above to perform fixation after the adjustment of lens positions. However, the lock nuts 37 and 57 are replaceable with wedge nuts.

Furthermore, an apparatus other than the projector described above may be configured as the projection-type display according to the present technology. For example, in the first embodiment described above, a reflective 3LCD-type projector using a reflective liquid crystal panel as an optical modulation element has been mentioned for description, but this is not limitative. The present technology is also applicable to a so-called transmissive 3LCD-type projector using a transmissive liquid crystal panel.

Moreover, the present embodiment gives an example using a reflective fluorescent light body wheel as one working example of the fluorescent light body wheel according to the present disclosure. However, the technology according to the present disclosure is also applicable, for example, to a transmissive fluorescent light body wheel.

It should be noted that the present technology may have the following configurations.

(1)

A light source device including:

a light source section;

a rotating body including a fluorescent light body, the fluorescent light body being excited by excitation light from the light source section to output fluorescent light;

a motor that drives the rotating body;

a housing that accommodates the rotating body;

one or more lens groups that gather the excitation light from the light source section and direct the excitation light toward the rotating body;

a lens holding section that holds the one or more lens groups; and an adjusting mechanism that adjusts a distance between the rotating body and the one or more lens groups.

(2)

The light source device according to (1), in which the adjusting mechanism includes the housing and the lens holding section.

(3)

The light source device according to (1) or (2), in which the lens holding section includes a fitting portion that fits the housing, and the housing has an opening for fitting, the opening corresponding to the fitting portion.

(4)

The light source device according to (3), in which the adjusting mechanism includes a thread provided on each of the fitting portion and the opening for fitting.

(5)

The light source device according to any of (1) to (4), in which the lens holding section and the housing are fixed using a washer, a lock nut, an adhesive, or a setscrew, the washer having a spring property.

(6)

The light source device according to (5), in which the washer having the spring property includes one of a wave washer, a spring lock washer, a conical spring washer, or a nord-lock washer.

(7)

The light source device according to any of (1) to (6), in which the lens holding section has an uneven structure on a side surface of an outer periphery portion.

(8)

The light source device according to (1), further including a motor holding section that holds the motor, in which the adjusting mechanism includes the housing and the motor holding section.

(9)

The light source device according to (1), further including:

a motor holding section that holds the motor; and a feed screw that feeds the motor holding section, in which the motor holding section has an opening for the feed screw, the opening corresponding to the feed screw, and the adjusting mechanism includes a thread provided on each of the feed screw and the opening for the feed screw.

(10)

The light source device according to (9), in which the lens holding section is integrated with the housing.

(11)

The light source device according to (9) or (10), in which the housing includes a motor accommodating section that accommodates the motor holding section, the motor accommodating section includes, therein, a guiding portion that guides a direction of movement of the motor holding section, and the motor holding section has a guided portion on a side surface, the guided portion fitting the guiding portion.

(12)

The light source device according to any of (9) to (11), in which the motor holding section and the housing are fixed using a washer, a lock nut, an adhesive, or a setscrew, the washer having a spring property.

(13)

The light source device according to (12), in which the washer having the spring property includes one of a wave washer, a spring lock washer, a conical spring washer, or a nord-lock washer.

(14)

A projection-type display including:

a light source device;

an optical modulation element that modulates light emitted from the light source device; and a projection optical system that projects the light from the optical modulation element, the light source device including a light source section, a rotating body including a fluorescent light body, the fluorescent light body being excited by excitation light from the light source section to output fluorescent light, a motor that drives the rotating body, a housing that accommodates the rotating body, one or more lens groups that gather the excitation light from the light source section and direct the excitation light toward the rotating body, a lens holding section that holds the one or more lens groups, and an adjusting mechanism that adjusts a distance between the rotating body and the one or more lens groups.

This application claims the priority on the basis of Japanese Patent Application No. 2017-194978 filed with Japan Patent Office on Oct. 5, 2017, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light source device, comprising:

a light source;

a rotating body including a fluorescent light body, the fluorescent light body being excited by excitation light from the light source to output fluorescent light;

a motor that drives the rotating body;

a housing that accommodates the rotating body;

one or more lens groups that gather the excitation light from the light source and direct the excitation light toward the rotating body;

a lens holder that holds the one or more lens groups;
an adjusting mechanism that adjusts a distance between the rotating body and the one or more lens groups;
a motor holder that holds the motor; and
a feed screw that feeds the motor holder, wherein
the motor holder has an opening for the feed screw, the opening corresponding to the feed screw,
the adjusting mechanism includes a thread provided on each of the feed screw and the opening for the feed screw, and
the lens holder includes a convex and concave structure configured to attach to and be rotated by a jig to adjust the distance between the rotating body and the one or more lens groups.

2. The light source device according to claim 1, wherein the adjusting mechanism includes the housing and the lens holder.

3. The light source device according to claim 1, wherein the lens holder includes a fitting portion that fits the housing,
the housing has an opening for fitting, and
the opening corresponds to the fitting portion.

4. The light source device according to claim 3, wherein the adjusting mechanism includes a thread provided on each of the fitting portion and the opening for fitting.

5. The light source device according to claim 1, wherein the lens holder and the housing are fixed using a washer, a lock nut, an adhesive, or a setscrew, and
the washer has a spring property.

6. The light source device according to claim 5, wherein the washer having the spring property includes one of a wave washer, a spring lock washer, a conical spring washer, or a nord-lock washer.

7. The light source device according to claim 1, wherein the lens holder has an uneven structure on a side surface of an outer periphery portion.

8. The light source device according to claim 1, wherein the adjusting mechanism includes the housing and the motor holder.

9. The light source device according to claim 1, wherein the lens holder is integrated with the housing.

10. The light source device according to claim 1, wherein the housing includes a motor housing that accommodates the motor holder,
the motor housing includes, therein, a guiding portion that guides a direction of movement of the motor holder, and
the motor holder has a guided portion on a side surface, the guided portion fitting the guiding portion.

11. The light source device according to claim 1, wherein the motor holder and the housing are fixed using a washer, a lock nut, an adhesive, or a setscrew, the washer having a spring property.

12. The light source device according to claim 11, wherein the washer having the spring property includes one of a wave washer, a spring lock washer, a conical spring washer, or a nord-lock washer.

13. A display, comprising:
a light source device;
an optical modulation element that modulates light emitted from the light source device; and
a projection optical system that projects the light from the optical modulation element, wherein
the light source device includes:
a light source,
a rotating body including a fluorescent light body, the fluorescent light body being excited by excitation light from the light source to output fluorescent light,
a motor that drives the rotating body,
a housing that accommodates the rotating body,
one or more lens groups that gather the excitation light from the light source and direct the excitation light toward the rotating body,
a lens holder that holds the one or more lens groups,
an adjusting mechanism that adjusts a distance between the rotating body and the one or more lens groups,
a motor holder that holds the motor, and
a feed screw that feeds the motor holder,
the motor holder has an opening for the feed screw, the opening corresponding to the feed screw,
the adjusting mechanism includes a thread provided on each of the feed screw and the opening for the feed screw, and
the lens holder includes a convex and concave structure configured to attach to and be rotated by a jig to adjust the distance between the rotating body and the one or more lens groups.

\* \* \* \* \*